US012621519B2

(12) United States Patent
Aksu et al.

(10) Patent No.: US 12,621,519 B2
(45) Date of Patent: May 5, 2026

(54) CARRIAGE AND SIGNALING OF NEURAL NETWORK REPRESENTATIONS

(71) Applicant: Nokia Technologies Oy, Espoo (FI)

(72) Inventors: Emre Aksu, Tampere (FI); Miska Hannuksela, Tampere (FI); Francesco Cricrì, Tampere (FI); Hamed Rezazadegan Tavakoli, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/978,234

(22) Filed: Dec. 12, 2024

(65) Prior Publication Data

US 2025/0113079 A1      Apr. 3, 2025

Related U.S. Application Data

(62) Division of application No. 18/247,631, filed as application No. PCT/IB2021/059123 on Oct. 5, 2021, now Pat. No. 12,219,204.

(60) Provisional application No. 63/091,087, filed on Oct. 13, 2020.

(51) Int. Cl.
H04N 21/435 (2011.01)
H04N 21/433 (2011.01)

(52) U.S. Cl.
CPC ......... H04N 21/435 (2013.01); H04N 21/433 (2013.01)

(58) Field of Classification Search
CPC .... H04N 21/435; H04N 21/433; H04N 19/70; H04N 21/8543; H04N 21/85406; G06N 3/04; G06N 3/0495; G06N 3/063; G06N 3/08; G06N 3/082; G06N 3/098
See application file for complete search history.

(56) References Cited

U.S. PATENT DOCUMENTS

2020/0107008 A1      4/2020 Hur et al.

FOREIGN PATENT DOCUMENTS

| EP | 3633990 A1 | 4/2020 |
| WO | 2020/014590 A1 | 1/2020 |
| WO | 2020/058570 A1 | 3/2020 |
| WO | 2020/070376 A1 | 4/2020 |
| WO | 2021/140275 A1 | 7/2021 |
| WO | 2021/209907 A1 | 10/2021 |

OTHER PUBLICATIONS

"Working Draft 4 of Compression of neural networks for multimedia content description and analysis", Video Subgroup, ISO/IEC JTC1/SC29/WG11/N19225, Apr. 2020, 51 pages.
"Information Technology—Coding of Audio-Visual Objects—Part 12: ISO Base Media File Format", ISO/IEC 14496-12, Fifth edition, Dec. 15, 2015, 248 pages.

(Continued)

*Primary Examiner* — Anthony Bantamoi
(74) *Attorney, Agent, or Firm* — Nokia Technologies Oy

(57) ABSTRACT

A method is provided for defining a metadata box of a neural network representation (NNR) item data, wherein the NNR item data comprises an NNR bitstream; and defining an association between the NNR item data and an NNR configuration by using a configuration item property, wherein the NNR configuration item property comprises information about stored NNR item data. Corresponding apparatuses and computer program products are also provided.

20 Claims, 17 Drawing Sheets

(56) References Cited

OTHER PUBLICATIONS

"Information Technology—Coding of Audio-Visual Objects—Part 14: MP4 File Format", ISO/IEC 14496-14, First edition, Nov. 15, 2003, 18 pages.

"Information Technology—Coding of Audio-Visual Objects—Part 15: Advanced Video Coding (AVC) File Format", ISO/IEC 14496-15, First edition, Apr. 15, 2004, 29 pages.

"3rd Generation Partnership Project; Technical Specification Group Services and System Aspects; Transparent end-to-end packet switched streaming service (PSS); 3GPP file format (3GP) (Release 15)", 3GPP TS 26.244, V15.0.0, Jun. 2018, pp. 1-67.

ISO/IEC 13818-1., Information Technology—Generic Coding of Moving Pictures and Associated Audio Information: Systems, Unknown Journal, Unknown Year, 1995,"Information technology—Coding of audio-visual objects—Part 15: Carriage of network abstraction layer (NAL) unit structured video in the ISO base media file format—Amendment 1: Support for neural-network post-filter supplemental enhancement information and other improvements", ISO/IEC 14496-15, May 2024, pp. 1-13.

"Use cases and requirements for compressed representation of neural networks", Requirements Subgroup, ISO/IEC JTC1/SC29/WG11/N17924, Oct. 2018, 37 pages.

"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.

"Information technology—Generic coding of moving pictures and associated audio information: Video", Series H: Audiovisual and Multimedia Systems Infrastructure of audiovisual services—Coding of moving video, ITU-T Recommendation H.262, Feb. 2000, 220 pages.

"Information technology—Universal coded character set (UCS)", ISO/IEC 10646, Sixth edition, Dec. 2020, 9 pages.

"IEEE 802.11", Wikipedia, Retrieved on Jan. 9, 2025, Webpage available at : https://en.wikipedia.org/wiki/IEEE_802.11.

"Video Coding for Low Bit Rate Communication", Series H: Audiovisual and Multimedia Systems, Infrastructure of audiovisual services—Coding of moving Video, ITU-T Recommendation H.263, Jan. 2005, 226 pages.

"Advanced Video Coding for Generic Audiovisual services", Series H: Audiovisual and Multimedia Systems, Infrastructure of audio-visual services—Coding of moving Video, Recommendation ITU-T H.264, Apr. 2017, 812 pages.

International Search Report and Written Opinion received for corresponding Patent Cooperation Treaty Application No. PCT/IB2021/059123, dated Dec. 14, 2021, 12 pages.

"[NNR] Harmonized high-level bitstream syntax extensions for compressed neural network representations", Nokia, ISO/IEC JTC1/SC29/WG11 MPEG2020/ m53954, Apr. 2020, 1 page.

"WD of Carriage of VVC in ISOBMFF", Systems, ISO/IEC JTC 1/SC 29/WG 11, N18856, Oct. 2019, 200 pages.

"Use cases and requirements for neural network compression for multimedia content description and analysis", Video Subgroup, ISO/IEC JTC1/SC29/WG11/N18731, Jul. 2019, 38 pages.

Notice of Allowance received for corresponding U.S. Appl. No. 18/247,631, dated Sep. 13, 2024, 8 pages.

1300

Figure 14:
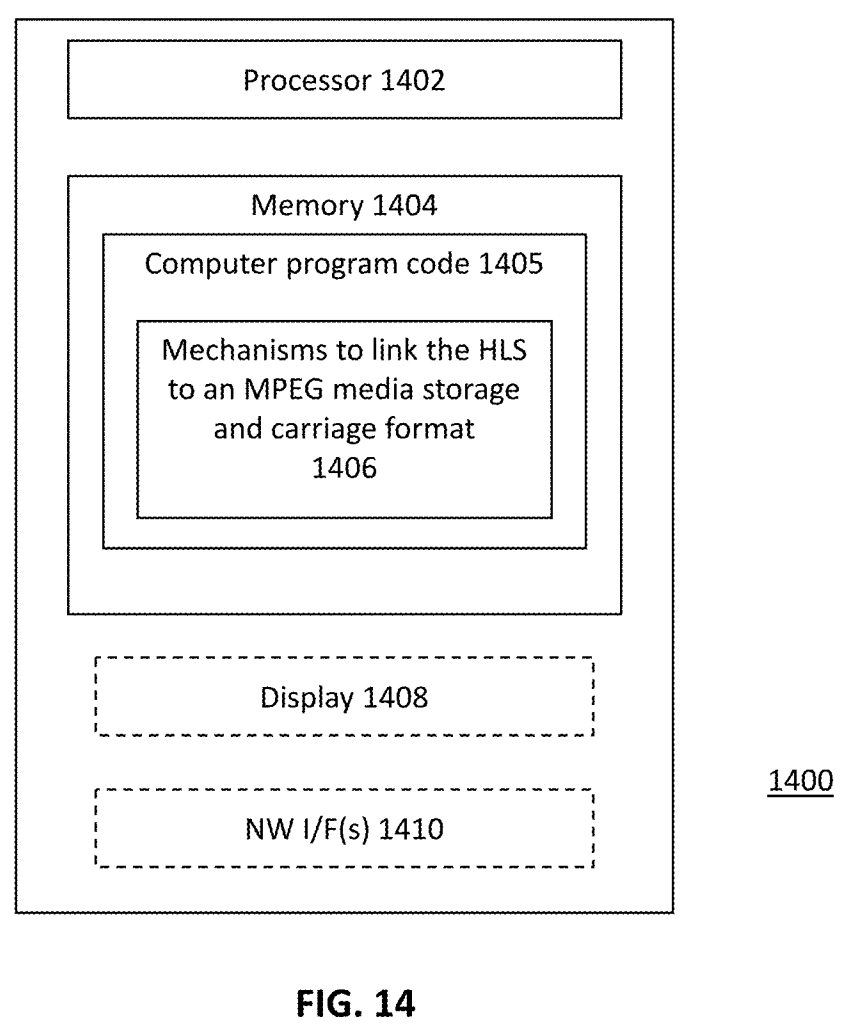

1400

Processor 1402

Memory 1404

Computer program code 1405

Mechanisms to link the HLS to an MPEG media storage and carriage format 1406

Display 1408

1502 Define a metadata box a neural network representation item data, wherein the NNR item data comprises an NNR bitstream 1504 Define an association between the NNR item data and NNR configuration by using a configuration item property, wherein the NNR configuration item property comprises information about stored NNR item data

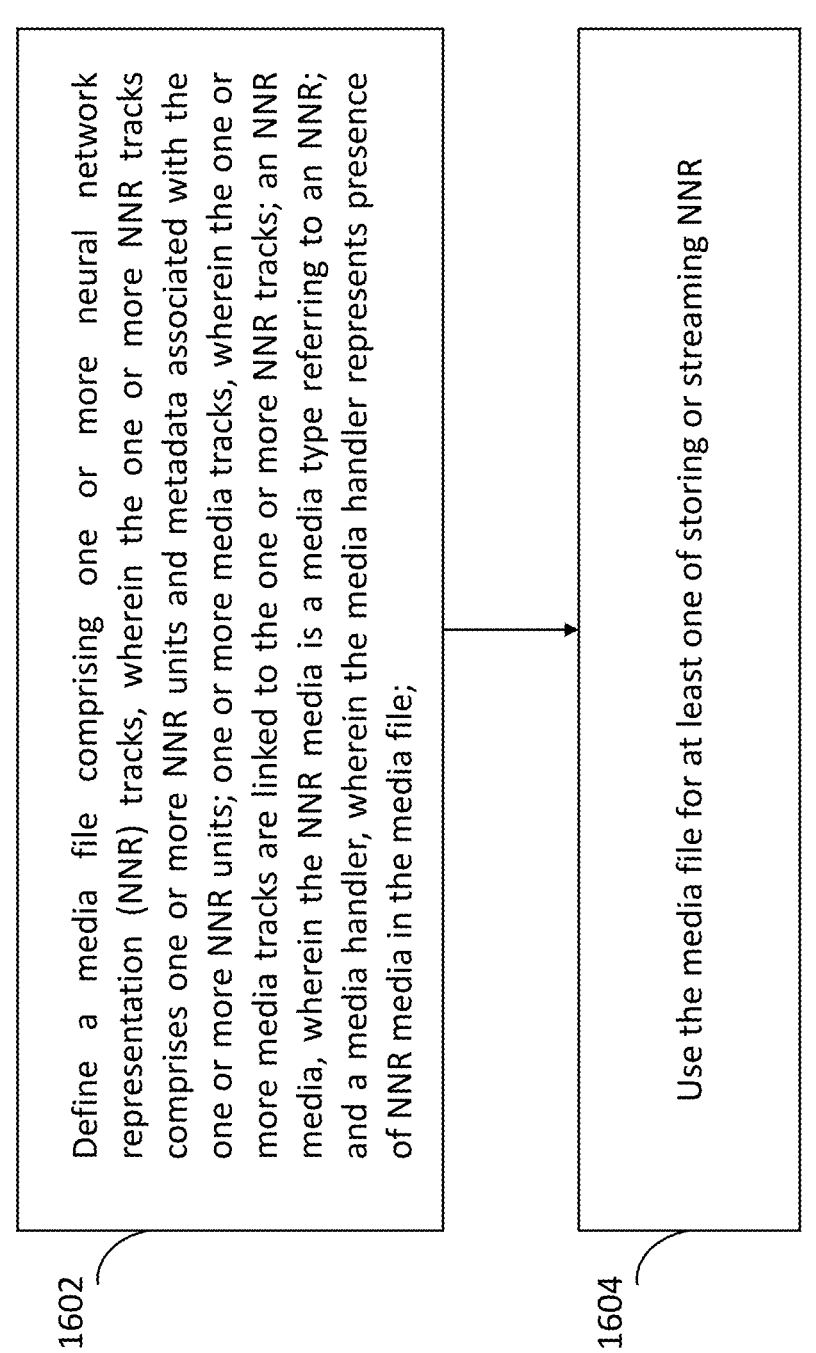

Define a media file comprising one or more neural network representation (NNR) tracks, wherein the one or more NNR tracks comprises one or more NNR units and metadata associated with the one or more NNR units; one or more media tracks, wherein the one or more media tracks are linked to the one or more NNR tracks; an NNR media, wherein the NNR media is a media type referring to an NNR; and a media handler, wherein the media handler represents presence of NNR media in the media file;

1602

Use the media file for at least one of storing or streaming NNR

CARRIAGE AND SIGNALING OF NEURAL NETWORK REPRESENTATIONS

RELATED APPLICATION

The present application is a divisional of U.S. patent application Ser. No. 18/247,631, filed on Mar. 31, 2023, which claims priority to International Application No. PCT/IB2021/059123; filed on Oct. 5, 2021, which claims benefit of U.S. Provisional Application No. 63/091,087, filed on Oct. 13, 2020, the content of which is incorporated herein by reference in its entirety.

TECHNICAL FIELD

The examples and non-limiting embodiments relate generally to multimedia transport and neural networks, and more particularly, to carriage and signaling of neural network representations.

BACKGROUND

It is known to provide standardized formats for exchange of neural network representations.

SUMMARY

An example method includes defining a metadata box for a neural network representation (NNR) item data, wherein the NNR item data comprises an NNR bitstream; and defining an association between the NNR item data and an NNR configuration by using a configuration item property, wherein the NNR configuration item property comprises information about stored NNR item data.

An another example method includes defining a media file comprising one or more neural network representation (NNR) tracks, wherein the one or more NNR tracks comprises one or more NNR units and metadata associated with the one or more NNR units; one or more media tracks, wherein the one or more media tracks are linked to the one or more NNR tracks; an NNR media, wherein NNR is a media type referring to an NNR; and a media handler, wherein the media handler represents presence of the NNR media in the media file; and using the media file for at least one of storing or streaming NNR.

An example apparatus comprises at least one processor; and at least one memory including computer program code; the at least one memory and the computer program code configured to, with the at least one processor, cause the apparatus at least to perform: define a metadata box for a neural network representation (NNR) item data, wherein the NNR item data comprises an NNR bitstream; and define an association between the NNR item data and an NNR configuration by using a configuration item property, wherein the NNR configuration item property comprises information about stored NNR item data.

An another example apparatus includes at least one processor; and at least one memory including computer program code; the at least one memory and the computer program code configured to, with the at least one processor, cause the apparatus at least to perform define a media file comprising one or more neural network representation (NNR) tracks, wherein the one or more NNR tracks comprises one or more NNR units and metadata associated with the one or more NNR units; one or more media tracks, wherein the one or more media tracks are linked to the one or more NNR tracks; an NNR media, wherein NNR is a media type referring to an NNR; and a media handler, wherein the media handler represents presence of the NNR media in the media file; and use the media file for at least one of storing or streaming NNR.

BRIEF DESCRIPTION OF THE DRAWINGS

The foregoing aspects and other features are explained in the following description, taken in connection with the accompanying drawings, wherein:

FIG. 14 is an example apparatus configured to implement mechanisms to link a high level syntax to an MPEG media storage and carriage format for a compressed representation of neural networks, in accordance with an embodiment.

FIG. 16 is a flowchart illustrating the operations performed to define a media file for storage and carriage of a compressed representation of neural networks.

DETAILED DESCRIPTION OF EXAMPLE EMBODIMENTS

Figure 1:
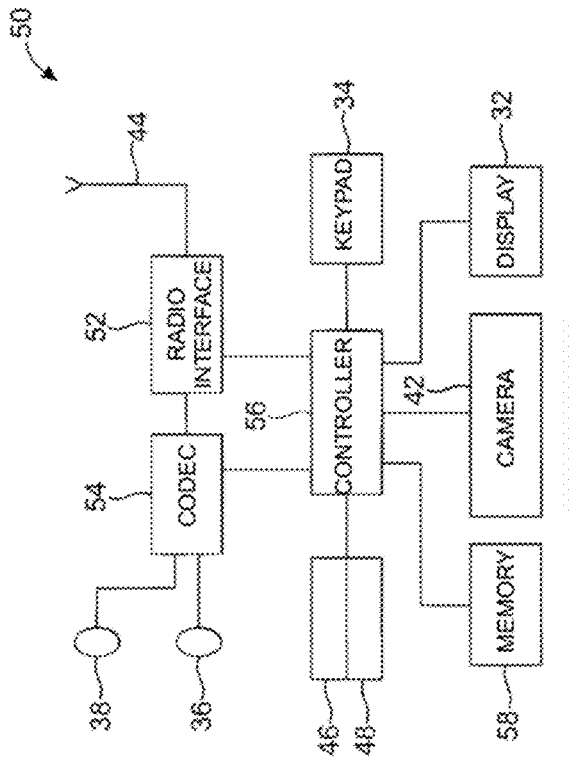
FIG. 1 shows schematically an electronic device employing embodiments of the examples described herein.

The following acronyms and abbreviations that may be found in the specification and/or the drawing figures are defined as follows:

| | |
|---|---|
| 3GP | 3GPP file format |
| 3GPP | 3rd Generation Partnership Project |
| 3GPP TS | 3GPP technical specification |
| 4CC | four character code |
| 4G | fourth generation of broadband cellular network technology |
| 5G | fifth generation cellular network technology |
| 5GC | 5G core network |
| ACC | accuracy |
| AI | artificial intelligence |
| AIoT | AI-enabled IoT |
| a.k.a. | also known as |
| AMF | access and mobility management function |
| AVC | advanced video coding |
| CABAC | context-adaptive binary arithmetic coding |
| CDMA | code-division multiple access |
| CE | core experiment |
| CU | central unit |
| DASH | dynamic adaptive streaming over HTTP |
| DCT | discrete cosine transform |
| DSP | digital signal processor |
| DU | distributed unit |
| eNB (or eNodeB) | evolved Node B (for example, an LTE base station) |
| EN-DC | E-UTRA-NR dual connectivity |
| en-gNB or En-gNB | node providing NR user plane and control plane protocol terminations towards the UE, and acting as secondary node in EN-DC |
| E-UTRA | evolved universal terrestrial radio access, for example, the LTE radio access technology |
| FDMA | frequency division multiple access |
| f(n) | fixed-pattern bit string using n bits written (from left to right) with the left bit first. |
| F1 or F1-C | interface between CU and DU control interface |
| gNB (or gNodeB) | base station for 5G/NR, for example, a node providing NR user plane and control plane protocol terminations towards the UE, and connected via the NG interface to the 5GC |
| GSM | Global System for Mobile communications |
| H.222.0 | MPEG-2 Systems is formally known as ISO/IEC 13818-1 and as ITU-T Rec. H.222.0 |
| H.26x | family of video coding standards in the domain of the ITU-T |
| HLS | high level syntax |
| IBC | intra block copy |
| ID | identifier |
| IEC | International Electrotechnical Commission |
| IEEE | Institute of Electrical and Electronics Engineers |
| I/F | interface |
| IMD | integrated messaging device |
| IMS | instant messaging service |
| IoT | internet of things |
| IP | internet protocol |
| ISO | International Organization for Standardization |
| ISOBMFF | ISO base media file format |
| ITU | International Telecommunication Union |
| ITU-T | ITU Telecommunication Standardization Sector |
| LTE | long-term evolution |
| LZMA | Lempel-Ziv-Markov chain compression |
| LZMA2 | simple container format that can include both uncompressed data and LZMA data |
| LZO | Lempel-Ziv-Oberhumer compression |
| LZW | Lempel-Ziv-Welch compression |
| MAC | medium access control |
| mdat | MediaDataBox |
| MME | mobility management entity |
| MMS | multimedia messaging service |
| moov | MovieBox |
| MP4 | file format for MPEG-4 Part 14 files |
| MPEG | moving picture experts group |
| MPEG-2 | H.222/H.262 as defined by the ITU |
| MPEG-4 | audio and video coding standard for ISO/IEC 14496 |
| MSB | most significant bit |
| NAL | network abstraction layer |
| NDU | NN compressed data unit |
| ng or NG | new generation |
| ng-eNB or NG-eNB | new generation eNB |
| NN | neural network |
| NNEF | neural network exchange format |
| NNR | neural network representation |

-continued

| | |
|---|---|
| NR | new radio (5G radio) |
| N/W or NW | network |
| ONNX | Open Neural Network eXchange |
| PB | protocol buffers |
| PC | personal computer |
| PDA | personal digital assistant |
| PDCP | packet data convergence protocol |
| PHY | physical layer |
| PID | packet identifier |
| PLC | power line communication |
| PSNR | peak signal-to-noise ratio |
| RAM | random access memory |
| RAN | radio access network |
| RFC | request for comments |
| RFID | radio frequency identification |
| RLC | radio link control |
| RRC | radio resource control |
| RRH | remote radio head |
| RU | radio unit |
| Rx | receiver |
| SDAP | service data adaptation protocol |
| SGW | serving gateway |
| SMF | session management function |
| SMS | short messaging service |
| st(v) | null-terminated string encoded as UTF-8 characters as specified in ISO/IEC 10646 |
| SVC | scalable video coding |
| S1 | interface between eNodeBs and the EPC |
| TCP-IP | transmission control protocol-internet protocol |
| TDMA | time divisional multiple access |
| trak | TrackBox |
| TS | transport stream |
| TV | television |
| Tx | transmitter |
| UE | user equipment |
| ue(v) | unsigned integer Exp-Golomb-coded syntax element with the left bit first |
| UICC | Universal Integrated Circuit Card |
| UMTS | Universal Mobile Telecommunications System |
| u(n) | unsigned integer using n bits |
| UPF | user plane function |
| URI | uniform resource identifier |
| URL | uniform resource locator |
| UTF-8 | 8-bit Unicode Transformation Format |
| WLAN | wireless local area network |
| X2 | interconnecting interface between two eNodeBs in LTE network |
| Xn | interface between two NG-RAN nodes |

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment in order to provide improved carriage and signaling of neural network representations.

Figure 2:
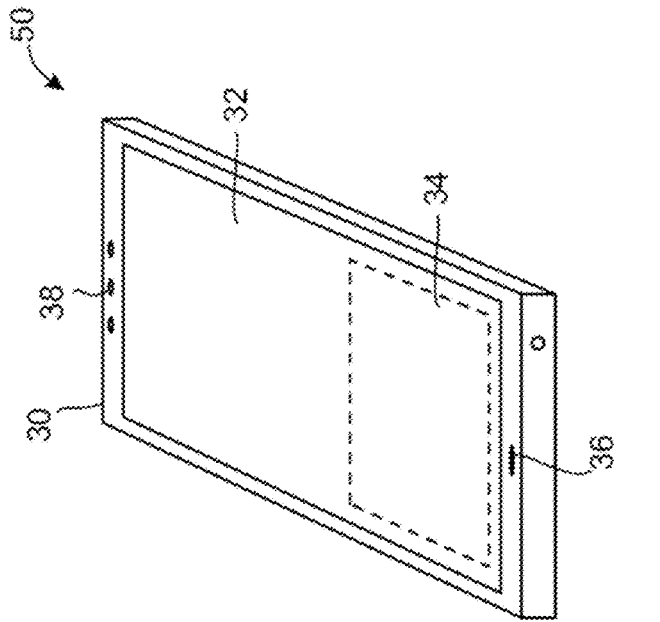
FIG. 2 shows schematically a user equipment suitable for employing embodiments of the examples described herein.

The following describes in detail suitable apparatus and possible mechanisms for a media (e.g. video or image) encoding process according to some embodiments. In this regard reference is first made to FIG. 1 and FIG. 2, where FIG. 1 shows an example block diagram of an apparatus 50. The apparatus may be an Internet of Things (IoT) apparatus configured to perform various functions, for example, gathering information by one or more sensors, receiving or transmitting information, analyzing information gathered or received by the apparatus, or the like. The apparatus may comprise a media coding system, which may incorporate a codec. FIG. 2 shows a layout of an apparatus according to an example embodiment. The elements of FIG. 1 and FIG. 2 will be explained next.

The apparatus 50 may for example be a mobile terminal or user equipment of a wireless communication system, a sensor device, a tag, or a lower power device. However, it would be appreciated that embodiments of the examples described herein may be implemented within any electronic device or apparatus which may process data by neural networks.

The apparatus 50 may comprise a housing 30 for incorporating and protecting the device. The apparatus 50 further may comprise a display 32 in the form of a liquid crystal display. In other embodiments of the examples described herein the display may be any suitable display technology suitable to display media or multimedia content, for example, an image or video. The apparatus 50 may further comprise a keypad 34. In other embodiments of the examples described herein any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus 50 may further comprise a camera 42 capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the examples described herein may store both data in the form of image and audio data and/or may also store instructions for implementation on the controller 56. The controller 56 may further be connected to codec circuitry 54 suitable for carrying out coding and/or decoding of audio and/or video data or assisting in coding and/or decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera 42 capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
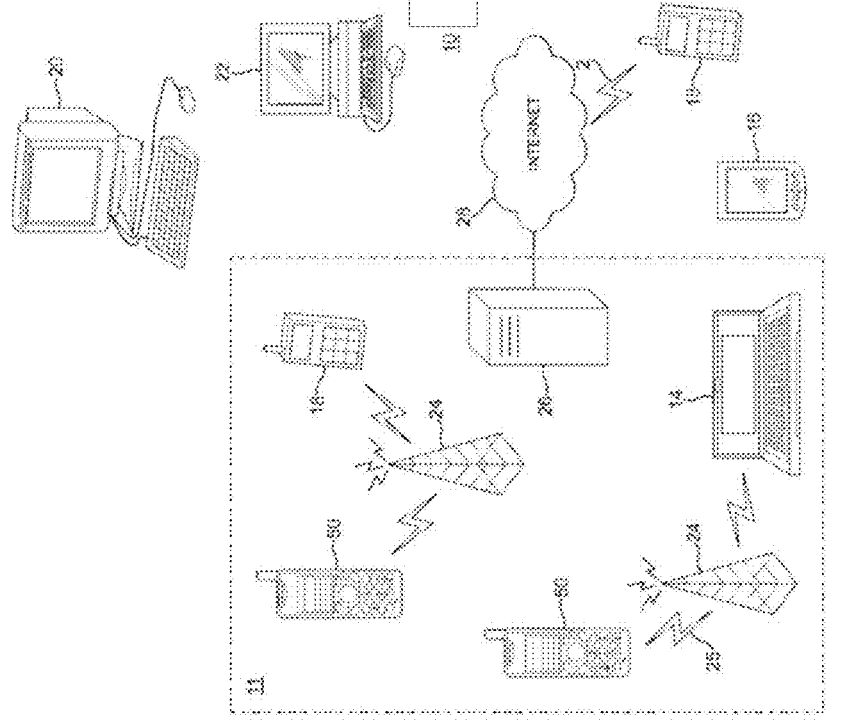
FIG. 3 further shows schematically electronic devices employing embodiments of the examples described herein connected using wireless and wired network connections.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA, LTE, 4G, 5G network, and the like), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; for example, a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in so-called IoT devices. The Internet of Things (IoT) may be defined, for example, as an interconnection of uniquely identifiable embedded computing devices within the existing Internet infrastructure. The convergence of various technologies has and may enable many fields of embedded systems, such as wireless sensor networks, control systems, home/building automation, and the like, to be included the Internet of Things (IoT). In order to utilize Internet IoT devices are provided with an IP address as a unique identifier. IoT devices may be provided with a radio transmitter, such as WLAN or Bluetooth transmitter or a RFID tag. Alternatively, IoT devices may have access to an IP-based network via a wired network, such as an Ethernet-based network or a power-line connection (PLC).

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can decompress the compressed video representation back into a viewable form. A video encoder and/or a video decoder may also be separate from each other, for example, need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, for example, the difference between the predicted block of pixels and the original block of pixels, is coded. This is typically done by transforming the difference in pixel values using a specified transform (for example, Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
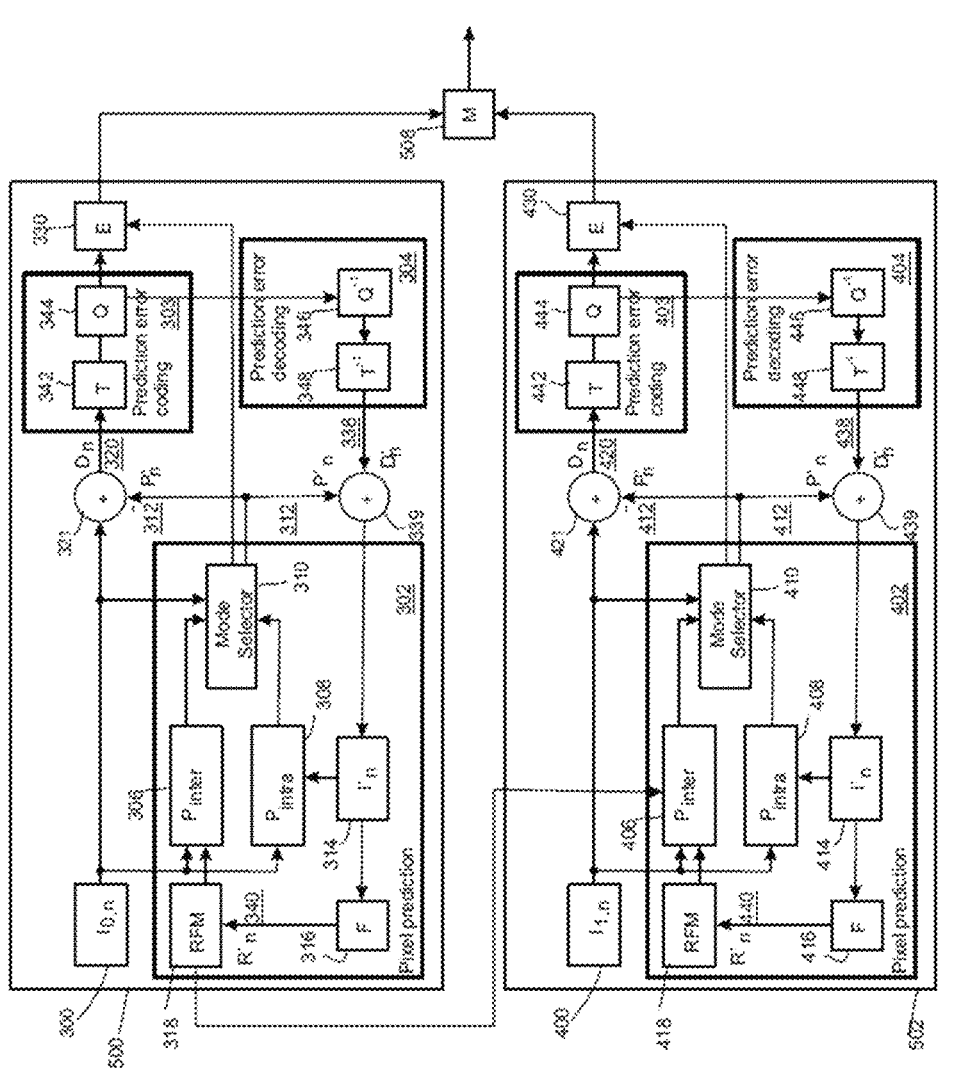
FIG. 4 shows schematically a block chart of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives base layer images 300 of a video stream to be encoded at both the inter-predictor 306 (which determines the difference between the image and a motion compensated reference frame) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives enhancement layer images 400 of a video stream to be encoded at both the inter-predictor 406 (which determines the difference between the image and a motion compensated reference frame) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to the filter 316, 416. The filter 316, 416 receiving the preliminary representation may filter the preliminary representation and output a final reconstructed image 340, 440 which may be saved in the reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, for example, the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 346, 446, which dequantizes the quantized coefficient values, for example, DCT coefficients, to reconstruct the transform signal and an inverse transformation unit 348, 448, which performs the inverse transformation to the reconstructed transform signal wherein the output of the inverse transformation unit 348, 448 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream, for example, by a multiplexer 508.

Figure 5:
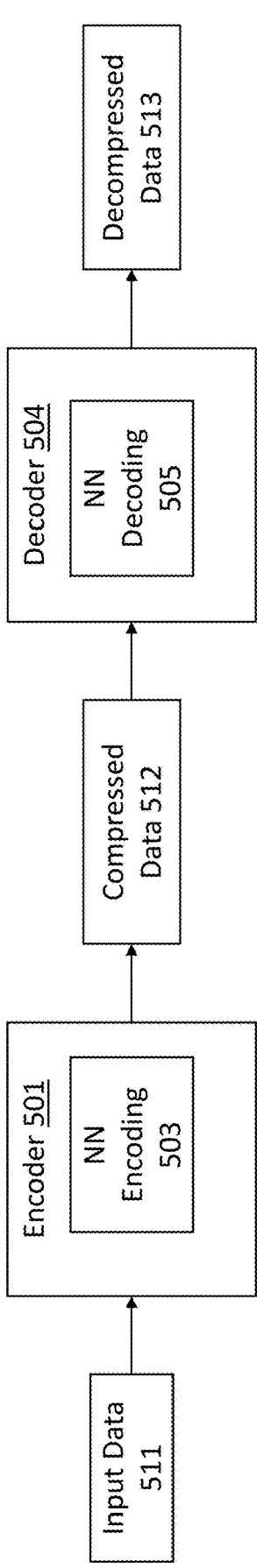
FIG. 5 is a block diagram showing the interface between an encoder and a decoder in accordance with the examples described herein.

FIG. 5 is a block diagram showing the interface between an encoder 501 implementing neural network encoding 503, and a decoder 504 implementing neural network decoding 505 in accordance with the examples described herein. The encoder 501 may embody a device, software method or hardware circuit. The encoder 501 has the goal of compressing input data 511 (for example, an input video) to compressed data 512 (for example, a bitstream) such that the bitrate is minimized and the accuracy of an analysis or processing algorithm is maximized. To this end, the encoder 501 uses an encoder or compression algorithm, for example to perform neural network encoding 503.

The general analysis or processing algorithm may be part of the decoder 504. The decoder 504 uses a decoder or decompression algorithm, for example to perform the neural network decoding 505 to decode the compressed data 512 (for example, compressed video) which was encoded by the encoder 501. The decoder 504 produces decompressed data 513 (for example, reconstructed data).

The encoder 501 and decoder 504 may be entities implementing an abstraction, may be separate entities or the same entities, or may be part of the same physical device.

The analysis/processing algorithm may be any algorithm, traditional or learned from data. In the case of an algorithm which is learned from data, it is assumed that this algorithm can be modified or updated, for example using optimization via gradient descent. One example of the learned algorithm is a neural network.

Figure 6:
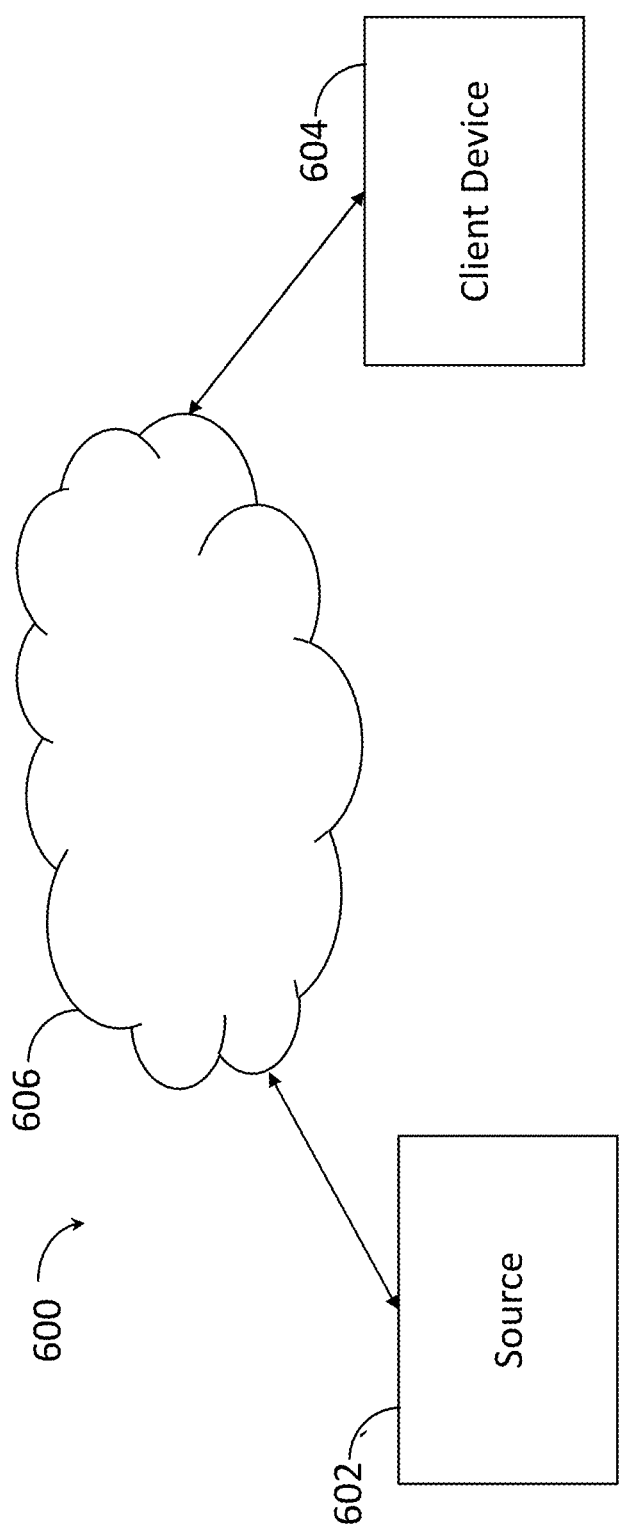
FIG. 6 illustrates a system configured to support streaming of media data from a source to a client device.

The method and apparatus of an example embodiment may be utilized in a wide variety of systems, including systems that rely upon the compression and decompression of media data and possibly also the associated metadata. In one embodiment, however, the method and apparatus are configured to accompany compressed the media data and associated metadata streamed from a source via a content delivery network to a client device, at which point the compressed media data and associated metadata is decompressed or otherwise processed. In this regard, FIG. 6 depicts an example of such a system 600 that includes a source 602 of media data and associated metadata. The source may be, in one embodiment, a server. However, the source may be embodied in other manners if so desired. The source is configured to stream boxes containing the media data and associated metadata to the client device 604. The client device may be embodied by a media player, a multi media system, a video system, a smart phone, a mobile telephone or other user equipment, a personal computer, a tablet computer or any other computing device configured to receive and decompress the media data and process the associated metadata. In the illustrated embodiment, boxes of media data and boxes of metadata are streamed via a network 606, such as any of a wide variety of types of wireless networks and/or wireline networks. The client device is configured to receive structured information containing media, metadata and any other relevant representation of information containing the media and the metadata and to decompress the media data and process the associated metadata (e.g. for proper playback timing of decompressed media data).

Figure 7:
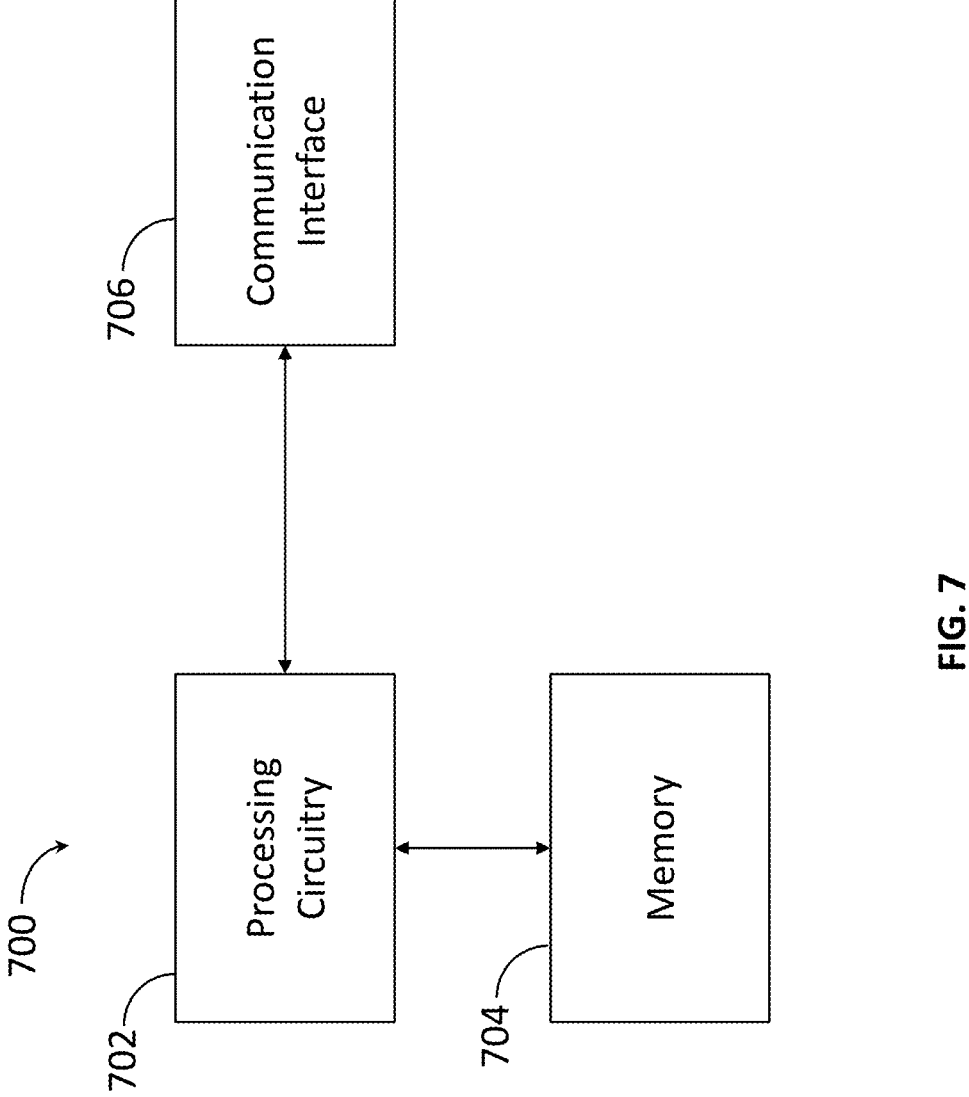
FIG. 7 is a block diagram of an apparatus that may be specifically configured in accordance with an example embodiment.

An apparatus 700 is provided in accordance with an example embodiment as shown in FIG. 7. In one embodiment, the apparatus of FIG. 7 may be embodied by the source 602, such as a file writer which, in turn, may be embodied by a server, that is configured to stream a compressed representation of the media data and associated metadata. In an alternative embodiment, the apparatus may be embodied by the client device 604, such as a file reader which may be embodied, for example, by any of the various computing devices described above. In either of these embodiments and as shown in FIG. 7, the apparatus of an example embodiment includes, is associated with or is in communication with processing circuitry 702, one or more memory devices 704, a communication interface 706 and optionally a user interface.

The processing circuitry 702 may be in communication with the one or more memory devices 704 via a bus for passing information among components of the apparatus 700. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 700 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 702 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 32 may be configured to execute instructions stored in the memory device 34 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 706 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the apparatus 700 may optionally include a user interface that may, in turn, be in communication with the processing circuitry 702 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device, and/or the like).

MPEG Compression of Neural Networks (NNR)

Figure 8:
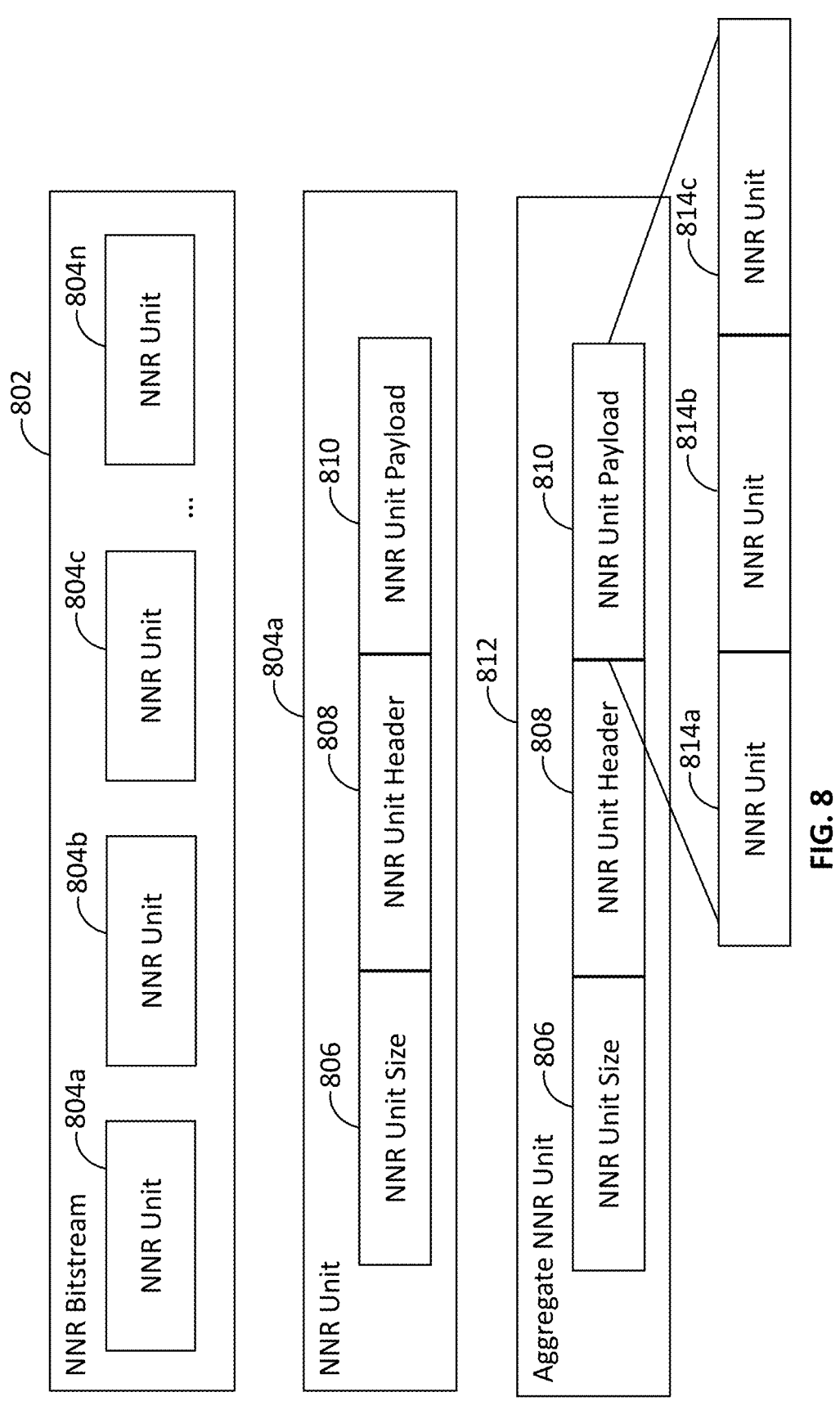
FIG. 8 illustrates example structure of an NNR bitstream.

FIG. 8 illustrates example structure of a neural network representations (NNR) bitstream 802. As depicted in FIG. 8, according to this structure, the NNR bitstream 802 includes multiple elemental units termed NNR Units (e.g. NNR units 804a, 804b, 804c, . . . 804n). An NNR Unit (e.g. 804a) represents a basic high-level syntax structure, and contains three syntax elements: an NNR Unit Size 806, an NNR unit header 808, an NNR unit payload 810. A bitstream may be formed by concatenating several NNR Units. NNR units may contain different types of data. The type of data that is contained in the payload of an NNR Unit defines the NNR Unit's type. This type is specified in the NNR unit header. The following table specifies the NNR unit header types and their identifiers.

| nnr_unit_type | Identifier | NNR Unit Type | Description |
|---|---|---|---|
| 0 | NNR_STR | NNR start unit | Compressed neural network bitstream start indicator |
| 1 | NNR_MPS | NNR model parameter set data unit | Neural network global metadata and information |
| 2 | NNR_LPS | NNR layer parameter set data unit | Metadata related to a partial representation of neural network |
| 3 | NNR_TPL | NNR topology data unit | Neural network topology information |
| 4 | NNR_QNT | NNR quantization data unit | Neural network quantization information |
| 5 | NNR_NDU | NNR compressed data unit | Compressed neural network data |
| 6 | NNR_AGG | NNR aggregate unit | NNR unit with payload containing multiple NNR units |
| 7 . . . 127 | NNR_RSVD | Reserved | MPEG-reserved range |
| 128 . . . 255 | NNR_UNSP | Unspecified | Unspecified range |

NNR unit is data structure for carrying neural network data and related metadata which is compressed or represented using this specification. NNR units carry compressed or uncompressed information about neural network metadata, topology information, complete or partial layer data, filters, kernels, biases, quantization weights, tensors, or the like. An NNR unit may include following data elements:

NNR unit size: This data element signals the total byte size of the NNR Unit, including the NNR unit size.

NNR unit header: This data element contains information about the NNR unit type and related metadata.

NNR unit payload: This data element contains compressed or uncompressed data related to the neural network.

NNR bitstream is composed of a sequence of NNR Units. The first NNR unit in an NNR bitstream shall be an NNR start unit (e.g. NNR unit of type NNR_STR). In an embodiment, NNR bitstream may include one or more NNR aggregate units (e.g. NNR aggregate unit 812). An NNR aggregate unit may be an NNR unit with payload containing multiple NNR units (e.g. NNR units 814a, 814b, and 814c).

Neural Network Exchange Formats

Several efforts have been made in recent years to allow for unified or standardized formats for exchange of neural networks among different runtime platforms (Linux, Windows, Android, IOS, and the like.), different deep learning frameworks (TensorFlow, Pytorch, and the like), and different languages (Python, C++, Java, and the like). Couple of examples of these formats, include neural network exchange format (NNEF) and open neural network exchange (ONNX). However, these exchange formats target general neural networks and are not optimized for compressed neural networks.

Neural Network Exchange Format (NNEF)

NNEF is a standard for the representation of neural networks developed by Khronos members. Its purpose is to define a format that encapsulates network structure and network data. To this end, it specifies a Network Structure File and Network Data files.

Network Structure File: The network structure is in human-readable format.
   Network Data File: the weights and other data of the network is represented in binary format. Separate data files are used for different parts of the network (e.g., for different "variables").
   Supports floating-point and quantized data.
   Quantization algorithms are expressed as extensible compound operations.
   The container format is not part of the NNEF specification, however, it is recommended to use the IEEE 1003.1-2008 tar archive with optional compression.

ONNX (Open Neural Network Exchange)

ONNX is an open ecosystem for interchangeable models that is developed by community of partners. ONNX facilitates mechanism for defining deep learning neural networks as computation over dataflow graphs. It, thus, provides the foundations required for the definition of:
   Extensible computation graph model
   Standard data types
   Built-in operators
   The model file associates metadata with a graph, and is used when first reading the model file to understand whether the runtime environment is able to run the model (e.g., checking whether all operators are supported).
   The data is stored in a file format which is based on protocol buffers (PB). PB is language and platform independent serialization mechanism. Network's data is stored in .proto or .proto3 files. Data in these files is stored as "messages". These files are then compiled into language-specific classes. By using such classes and the model definition (which is stored in a .onnx file), a platform can then run the model.

ISO Base Media File Format

Available media file format standards include ISO base media file format (ISO/IEC 14496-12, which may be abbreviated ISOBMFF), MPEG-4 file format (ISO/IEC 14496-14, also known as the MP4 format), file format for NAL (Network Abstraction Layer) unit structured video (ISO/IEC 14496-15) and 3GPP file format (3GPP TS 26.244, also known as the 3GP format). ISOBMFF is the base for derivation of all the above mentioned file formats (excluding the ISOBMFF itself).
   Some concepts, structures, and specifications of ISOBMFF are described below as an example of a container file format, based on which the embodiments may be implemented. The embodiments of the invention are not limited to ISOBMFF, but rather the description is given for one possible basis on top of which various embodiments may be partly or fully realized.
   A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.
   According to the ISO base media file format, a file includes media data and metadata that are encapsulated into boxes. Each box is identified by a four character code (4CC) and starts with a header which informs about the type and size of the box.
   In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.
   Tracks comprise samples, such as audio or video frames. For video tracks, a media sample may correspond to a coded picture or an access unit. A media track refers to samples (which may also be referred to as media samples) formatted according to a media compression format and its encapsulation to the ISO base media file format. A hint track refers to hint samples, containing cookbook instructions for constructing packets for transmission over an indicated communication protocol. A timed metadata track may refer to samples describing referred media and/or hint samples.
   The 'trak' box contains a Sample Table box. The Sample Table box includes, for example, time and data indexing of the media samples in a track. The Sample Table box is required to contain a Sample Description box. The Sample Description box includes an entry count field, specifying the number of sample entries included in the box. The Sample Description box is required to contain at least one sample entry. The sample entry format depends on the handler type for the track. Sample entries give detailed information about the coding type used and any initialization information needed for that coding.
   Movie fragments may be used, for example, while recording content to ISO files. Movie fragments may avoid, for example, losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used, and the initial movie box is smaller compared to a file with the same media content but structured without movie fragments.
   The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited, and the use cases mentioned above be realized.

In some examples, the media samples for the movie fragments may reside in an mdat box. However, for the metadata of the movie fragments, a MovieFragmentBox (moof box) may be provided. The moof box may include the information for a certain duration of playback time that would previously have been in the moov box. The moov box may still represent a valid movie on its own, but in addition, it may include an MovieExtendsBox (mvex box) indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISOBMFF specification.

A self-contained movie fragment may be defined to consist of a moof box and an mdat box that are consecutive in the file order and where the mdat box contains the samples of the movie fragment (for which the moof box provides the metadata) and does not contain samples of any other movie fragment (e.g. any other moof box).

A media segment may comprise one or more self-contained movie fragments. A media segment may be used for delivery, such as streaming, e.g. in MPEG-DASH.

The track reference mechanism can be used to associate tracks with each other. The TrackReferenceBox includes box(es), each of which provides a reference from the containing track to a set of other tracks. These references are labelled through the box type (e.g. the four-character code of the box) of the contained box(es).

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There multiple may instances of the SampleToGroupBox and be SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description box included in each track may provide a list of sample entries, each providing detailed information about the coding type used, and any initialization information needed for that coding. Samples of a chunk and samples of a track fragment may use the same sample entry. A chunk may be defined as a contiguous set of samples for one track. The data reference (dref) box, which may also be included in each track, may define an indexed list of uniform resource locators (URLs), uniform resource names (URNs), and/or self-references to the file containing the metadata. A sample entry may point to one index of the data reference box (which, in the syntax, may be referred to as DataReferenceBox), thereby indicating the file containing the samples of the respective chunk or track fragment.

Files conforming to the ISOBMFF may contain any non-timed objects, referred to as items, meta items, or metadata items, in a meta box (four-character code: 'meta'), also referred to as MetaBox or metabox. While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level.

The meta box may be required to contain a 'hdlr' box indicating the structure or format of the 'meta' box contents.

The meta box may list and characterize any number of items that can be referred and each one of them can be associated with a file name and are uniquely identified with the file by item identifier (item_id) which is an integer value. The metadata items may be for example stored in the ItemDataBox ('idat' box) of the meta box or in an 'mdat' box or reside in a separate file. If the metadata is located external to the file, then its location may be declared by the DataInformationBox (four-character code: 'dinf').

In the specific case that the metadata is formatted using extensible Markup Language (XML) syntax and is required to be stored directly in the MetaBox, the metadata may be encapsulated into either the XMLBox (four-character code: 'xml') or the BinaryXMLBox (four-character code: 'bxml').

An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents.

The ItemPropertiesBox enables the association of any item with an ordered set of item properties. Item properties may be regarded as small data records. The ItemProperties-Box consists of two parts: ItemPropertyContainerBox that contains an implicitly indexed list of item properties, and one or more ItemProperty AssociationBox(es) that associate items with item properties.

Item references may be indicated in the ItemReference-Box ('iref'). The ItemReferenceBox allows the linking of one item to others via typed references. All the references for one item of a specific type are collected into a SingleItem-TypeReferenceBox, whose type (in the box header) is the reference type, and which has a from_item_ID field indicating which item is linked. The items linked to are then represented by an array of to_item_IDs. All these single item type reference boxes are then collected into the ItemRefer-enceBox.

DataReferenceBox ('dref' box) contains a list of boxes that declare the potential location(s) of the media data referred to by the file. DataReferenceBox is contained by DataInformationBox, which in turn is contained by Medi-aInformationBox or MetaBox. When contained in the Medi-aInformationBox, each sample entry of the track contains a data reference index referring to a list entry of the list of box(es) in the DataReferenceBox. When contained in the MetaBox, the ItemLocationBox gives, for each item, the data reference index referring to a list entry of the list of box(es) in the DataReferenceBox. The box(es) in the DataReferenceBox are extended from FullBox, e.g. contain the version and the flags field in the box header. As an example, DataReferenceBox may comprise DataEntryUrl-Box and DataEntryUrnBox, which provide a uniform resource locator (URL) and a uniform resource name (URN) data reference, respectively. When the least significant bit of the flags field of either DataEntryUrlBox or DataEntryUrn-Box is equal 1, the respective data reference refers to the containing file itself and no URL or URN string is provided within the DataEntryUrlBox or the DataEntryUrnBox.

In ISOBMFF, a track group enables grouping of tracks based on certain characteristics or the tracks within a group have a particular relationship. Track grouping, however, does not allow any items in the group.

In ISOBMFF, entity grouping is similar to track grouping but enables grouping of both tracks and items in the same group. Each entity group is specified by an EntityToGroup-Box, and all the entity groups of a particular level (file, movie, or track) are contained in a GroupsListBox of the MetaBox of that level. The box type of the EntityToGroup-Box indicates the type of the grouping. An EntityToGroup-Box contains a group_id and a list of entity_id values. A group_id is a non-negative integer assigned to the particular grouping that is not equal to any group_id value of any other EntityToGroupBox, any item_ID value of the hierarchy level (file, movie. or track) that contains the GroupsListBox, or any track_ID value (when the GroupsListBox is contained in the file level). An entity is either a track or an item. An entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

A Matroska file format is capable of, but not limited to, storing any of video, audio, picture, or subtitle tracks in one file. A Matroska file extensions include .mkv for video (with subtitles and audio), .mk3d for stereoscopic video, .mka for audio-only files, and .mks for subtitles only. Matroska may be used as a basis format for derived file formats, such as WebM.

Matroska uses Extensible Binary Meta Language (EBML) as a basis. EBML specifies a binary and octet (byte) aligned format inspired by the principle of XML. EBML itself is a generalized description of the technique of binary markup. A Matroska file consists of Elements that make up an EBML 'document'. Elements incorporate an Element ID, a descriptor for the size of the element, and the binary data itself. Elements in Matroska file can be nested.

A Segment Element of Matroska is a container for other top-level (level 1) elements. A Matroska file may include, but is not limited to be composed of, one segment. Multi-media data in Matroska files is organized in Clusters (or Cluster Elements), each containing typically a few seconds of multimedia data. A Cluster comprises BlockGroup ele-ments, which in turn comprise Block Elements. A Cues Element comprises metadata which may assist in random access or seeking and may include file pointers or respective timestamps for seek points.

MPEG NNR specification defines how to store NNR coded data as a bitstream, as defined in its high level syntax (HLS). However, MPEG NNR Specification lacks the mechanisms to link the HLS to a storage and carriage format (e.g. ISOBMFF), and consequently to a streamable format (e.g. ISOBMFF segments for streaming). Accordingly, some embodiments of the invention provide mechanisms for adapting an MPEG storage and carriage format to be able to carry NNR bitstream(s). NNR specification also provides a high level syntax for the carriage of a compressed neural network data, accordingly, an NNR bitstream also refers to any fully or partially compressed or compacted neural network model data that is, independent of the coding method.

Various embodiments of the invention, cover such mecha-nisms and methods to carry NNR encoded bitstreams in ISOBMFF or similar object oriented storage formats, such as Matroska (MKV), Apple QuickTime Format (MOV), or AVI format:

As non-timed NNR encoded items

As timed NNR encoded bitstream

Hereafter, we refer to ISOBMFF, any derivatives of ISOBMFF, or any object oriented storage formats similar to ISOBMFF as an ISOBMFF-like format.

Various embodiments of the invention also define:

Method to store and signal NNR coded data in ISOBMFF-like formats

Method to signal the presence of NNR coded data as timed or non-timed data structures Method to store and relate NNR coded neural network models and model updates in relation with stored media data NNR coded data could be stored in ISOBMFF-like for-mats as:

1. Non-timed data: There is no time aspect of the stored NNR data (e.g. a neural network model). Such NNR bitstreams may be stored as 'items' or NNR items.

2. Timed data: The stored NNR coded data may change over time (e.g. a neural network model whose weights and model are updated in time). Such NNR bitstreams may be stored as 'samples' in specific tracks.

Non-Timed Storage of NNR Data

A new item type called 'NNR item' may be defined. NNR item may be referred to as NNR item data in some embodi-ments. The metadata for NNR items may be included in a meta box like the metadata for any other items. NNR items may be stored in an ISOBMFF file or in an external file similarly to any other items as described earlier. For example, NNR items may be stored in the ItemDataBox of the meta box of an ISOBMFF file. Such storage could be at file level, movie box level, or track level. In track level storage, a media track may be dependent on the non-timed neural network to process its samples. The process may be associated to visual enhancement of decoded media data, decoding of the media data in the sample, or alike. In another example, NNR items may be stored in one or more media data boxes (e.g. MediaDataBox) of an ISOBMFF file, while the metadata for items may be included in a meta box, which may be stored at file level, movie box level, or track level.

In movie box level storage, several media tracks may be dependent on or may be enhanced by a non-timed neural network to process their samples. As an example, the decoded pictures of all the video tracks could be enhanced by the same neural network.

ISOBMFF files with NNR items may be identified by a brand in the compatible brands list or major brand. Such a brand could be a 4CC code such as, but not limited to, 'innr'. Brands may be carried e.g. in file-level in a FileTypeBox, in track-level in a TrackTypeBox, in item-level in a Brand-Property, and/or in a segment-level in a SegmentTypeBox.

A metabox which carry NNR items may have a handler type defined in its HandlerBox. Such a handler type may be a 4CC code such as, but not limited to, 'nnrh'.

Option 1

Figure 9:
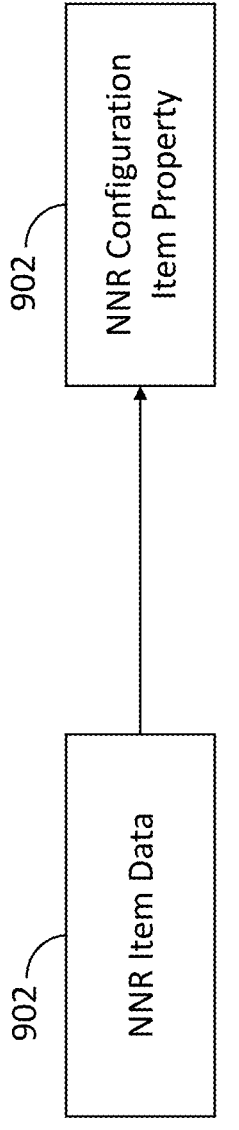
FIG. 9 illustrates an example association between a neural network representation (NNR) item data and configuration of the NNR item data.

FIG. 9 illustrates an example association between a neural network representation (NNR) item and configuration of the NNR item. The NNR item and its relationship with its configuration may be realized using an NNR item data 902 (may also be referred to as data of NNR item) and a NNR configuration item property 904 as depicted in FIG. 9.

as The NNR item data 902 in some embodiments, is comprised of NNR bitstream as defined in MPEG NNR specification. The NNR configuration item property 904 may contain NNR_MPS or NNR_LPS unit(s), as well as other configuration information, for example, full or partial quantization, topology and global parameter values required for decoding compressed NNR unit payloads about the stored NNR item data. The NNR configuration item property 904 may contain NNRDecoderConfigurationRecord as defined in the upcoming sections. In some example embodiments, 'nnri' may be used as 4CC for the NNR item, and 'nnrc' may be used as 4CC for the NNR configuration item property.

Option 2

Figure 10:
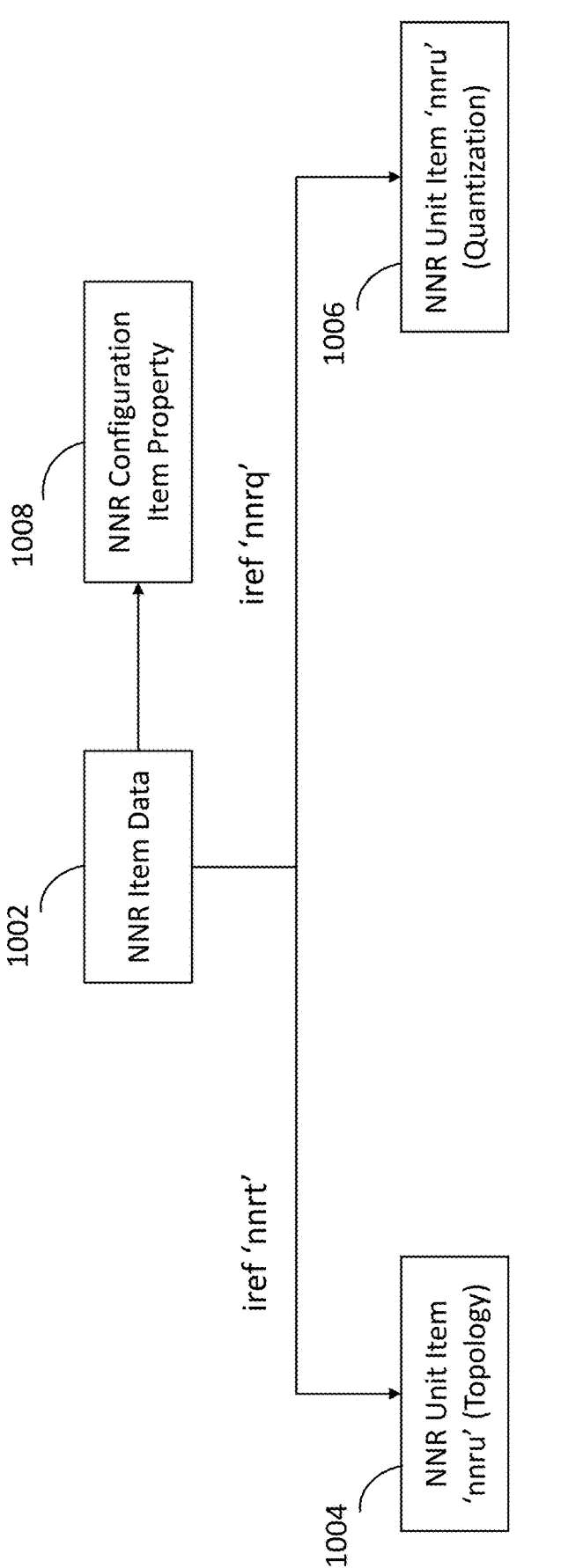
FIG. 10 illustrates an example association between the NNR item data, configuration of the NNR item data, topology of the NNR item data, and data associated with NNR item data quantization, in accordance with an embodiment.

FIG. 10 illustrates an example association between the NNR item data 1002, configuration of the NNR item data, the configuration of the NNR item data, topology of the NNR item data, and data associated with NNR item data quantization, in accordance with an embodiment. As depicted in FIG. 10, data of an NNR item data 1002, an NNR unit item (topology) 1004, and an NNR unit item (quantization) 1006 related data are stored separately and then related to each other by item referencing. An NNR configuration item property 1008 may contain NNRDecoderConfigurationRecord. In some example embodiments, NNRDecoderConfigurationRecord includes records of NNR decoder configuration.

In an embodiment, 'nnru' may be used as a 4CC for representing NNR unit item. Accordingly, NNR unit item (topology), and NNR unit item (quantization) may have same 4CC codes, for example, 'nnru'.

In another embodiment, topology and quantization related NNR unit items may have specific item types such as topology unit item and quantization unit items with specific 4CC codes.

Data of the NNR item data 1002 is comprised of NNR units. Data of NNR item data 1002 may or may not contain NNR_STR, NNR_TPL or NNR_QNT units.

NNR unit item of type 'nnru' (topology) may contain NNR Unit of type NNR_TPL. Alternatively, topology payload can be referenced by utilizing 'dref' referencing mechanism of ISOBMFF to an external file location and using data_reference_index to refer to this file reference. For example, topology may be in NNEF file format and externally provided by other means in a known file storage mechanism or link.

NNR unit item of type 'nnru' (quantization) may contain NNR Unit of type NNR_QNT. Alternatively, quantization payload can be referenced by utilizing 'dref' to an external file location and using data_reference_index to refer to this file reference. For example, quantization information may be in NNEF file format and externally provided by other means in a known file storage mechanism or link.

In another embodiment, NNR unit items which carry topology and quantization information may have different unit types.

The relationship between the NNR item data and NNR unit items may be established by utilizing item reference mechanism. A particular item reference type such as 'nnrt' may be defined for such a purpose, in order to indicate the topology related relationship. Similarly, a particular item reference type such as 'nnrq' may be defined for indicating quantization related relationship.

In another embodiment, the relationship between NNR item data and other NNR units, for example, NNR units which are not topology or quantization related units, may be established by utilizing entity grouping mechanism. For example, an entity group of a particular type may be defined to contain the item ID values of the NNR item data and other NNR units.

In another embodiment, when external data sources such as topology and quantization data are references, they may be stored as items of type 'uri'. Such items may carry URIs as payloads and such URIs may point to network-accessible information sources.

Option 3

Figure 11:
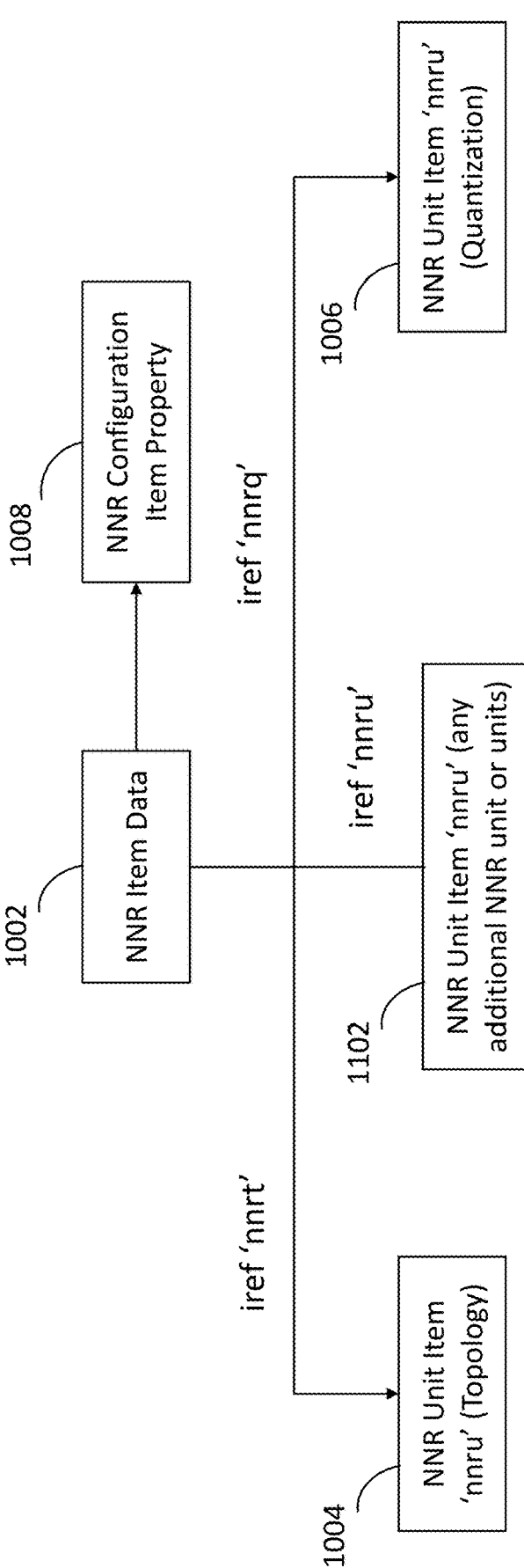
FIG. 11 illustrates an example embodiment in which NNR data item is configured into one or more NNR unit items.

FIG. 11 illustrates an example embodiment in which NNR data item is configured into one or more NNR unit items. As depicted in FIG. 11, in addition to Option 2, NNR item data may be further configured into one or more NNR unit items 1102, where each NNR unit item may contain one or more NNR units. Any additional unit item may be stored in other NNR unit items with an item reference of type 'nnru'.

Option 4

Figure 12:
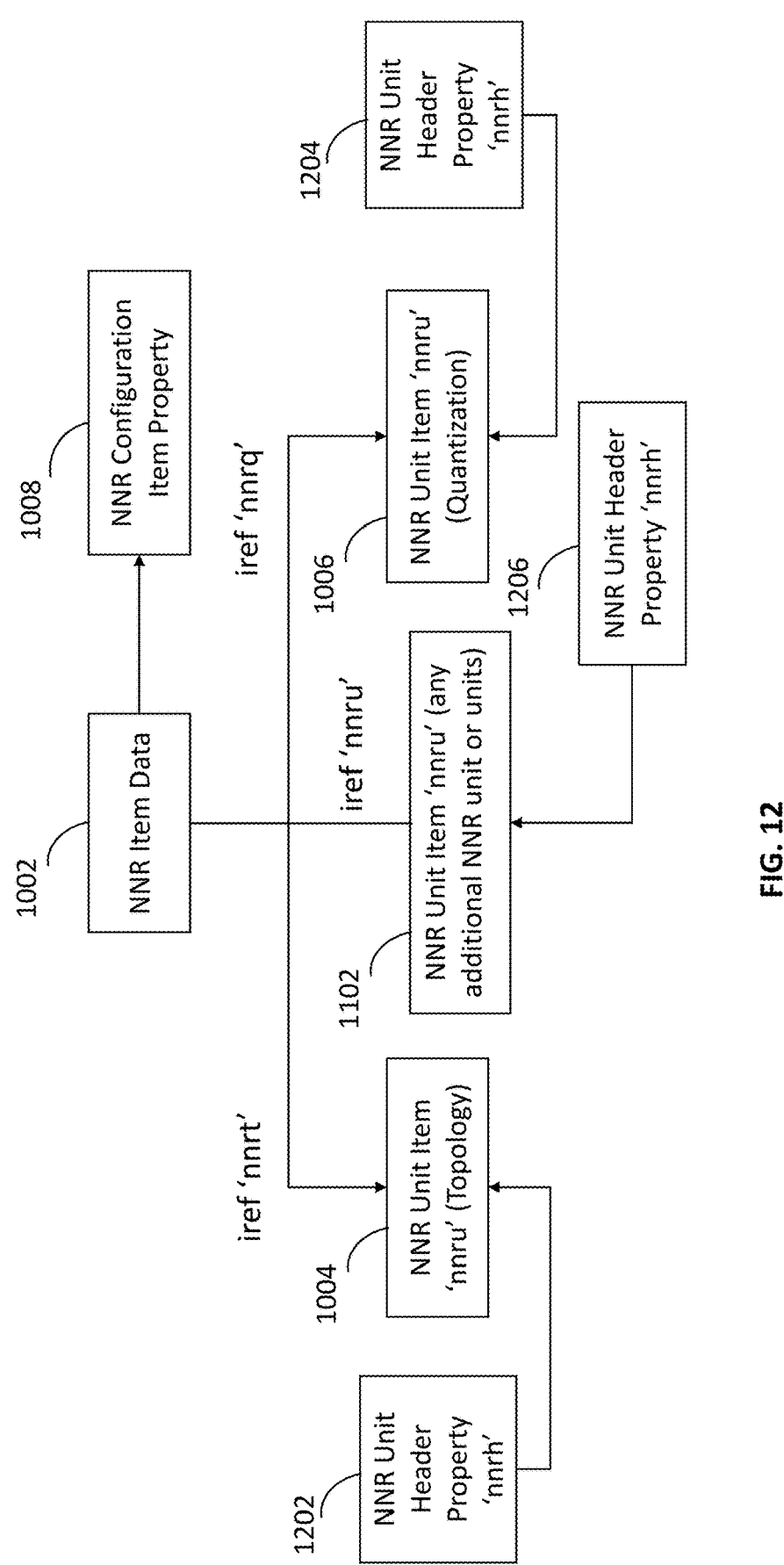
FIG. 12 illustrates an example embodiment in which NNR unit header information is configured into an item property.

Referring now to FIG. 12, it illustrates, an example embodiment in which NNR unit header information is configured into an item property. As depicted in FIG. 12, in addition to Option 3, an NNR unit header information may be further configured into a separate item property. In an embodiment, the NNR unit header information may be divided into a separate item property Such a property my further be associated with related NNR unit items. For example, an NNR unit header property 1202 is associated with the NNR unit item (topology) 1004, an NNR unit header property 1204 is associated with the NNR Unit Item (quantization) 1006, and an NNR unit header 1206 property is associated with the one or more NNR unit items 1102.

In an example embodiment, multiple NNR units may be present in an NNR unit item. In this embodiment, the NNR unit item may have different NNR unit headers and unit header property may not be present. Further in this embodiment, NNR unit headers are present in the actual data of NNR unit item.

Entity Grouping for Linking NNR Unit Items and NNR Items Together

Use ISOBMFF entity grouping mechanism (e.g. Entity-ToGroup box) with a grouping type of 'NNRG' to link NNR related items together, for example:
  EG ('NNRG'): {NNR item, NNR unit item(s)}
NNR unit items can be resolved by analysing their NNR unit header item properties.

In another embodiment, NNR unit items could be in a pre-defied order in the entity group, e.g. topology and quantization first and then other NNR unit items.

In yet another embodiment, extents are used to express an NNR item data consisting of several pieces.

In ISOBMFF, items may be stored fragmented into extents, e.g. to enable interleaving. An extent is a contiguous subset of the bytes of the resource. ItemLocationBox includes a count of extents for an item. ItemLocationBox contains a loop from 0, inclusive, up to the count of extents, exclusive, where each loop entry contains syntax elements indicating the starting position of the respective extent within the file and the byte count of the respective extent. The resource (e.g., the item data) is formed by concatenating the extents in the order of extents in the loop included in the item location box.

In still another embodiment, both item references and extents are used to represent an NNR bitstream.

Item reference may be used e.g. for item topology that is stored in an external file. This may be needed when the topology uses an externally defined format (e.g. NNEF or ONNX).

Extents may be used e.g. for a sequence of NNR units. For example, an item may contain an NNR bitstream, and one extent of the item may contain a single NNR unit contained within the NNR bitstream. In another example, an item may contain an NNR aggregate unit, and one extent of the item may contain a single NNR unit contained within the NNR aggregate unit. Thus, extents may be used to locate NNR units within the structure (e.g. NNR bitstream or NNR aggregate unit) that contains the NNR units.

Timed Storage of NNR Data

A timed storage of NNR data could be utilized in the following use cases:
  A hybrid audio/video codec where decoding of audio/video coded samples also require neural network models which needs to be updated in time for best decoding performance (e.g. NN overfitted to a group of pictures, NN updated to decode an NN-encoded picture, and the like.)
    Such NNs could be stored either in the sample data or independently in their own track and samples.
  Such NN samples could be:
    independently decodable (like Intra pictures in video coding)

dependent on previous samples (like inter pictures or like NNR weight updates)
  Utilized in multiple media samples
  In a hierarchical form:
    Generic NN (can be like a static data, e.g. in metabox of initialization segment, or it could be in the NN track, or it could be pre-defined in the specification and enumerated; there could be also configuration parameters related to it).
    This information could be signaled part of the audio/video bitstream
  Weight/architecture updates to an NN model in time
    Example of weight update could be Federated Learning use cases
    Example of architecture update could be structural pruning where part of the network is influenced by a pruning algorithm In another embodiment, NN tracks could have time-aligned samples with the samples of associated media tracks.
  Global NN weight updates could be stored e.g. in a new box in the track-level, a sample entry, sample group entries, or samples. Storing them in sample entry or sample group entry may be beneficial over the other alternatives e.g. for unicast streaming services.
  NN weight updates may be aligned with the Group of Picture structures of media data and media track. In such a case the NN data could be stored in the samples of NN track.

In yet another embodiment, NNR coded data may be stored in conjunction with media data as follows:
  There could be NAL units which are NNR compressed and defined in audio/video codec scope. Such NAL units could be collected in NN tracks as samples of this track then linked to the video track
  The same NN track may be linked or referenced by multiple audio/video tracks. This could be especially useful when there are multiple representations of the same media track which can utilize the same NN in its samples.

In still another embodiment, such media samples may contain further NN updates in their bitstreams as specially marked data structures (e.g. NN specific NAL units).

Figure 13:
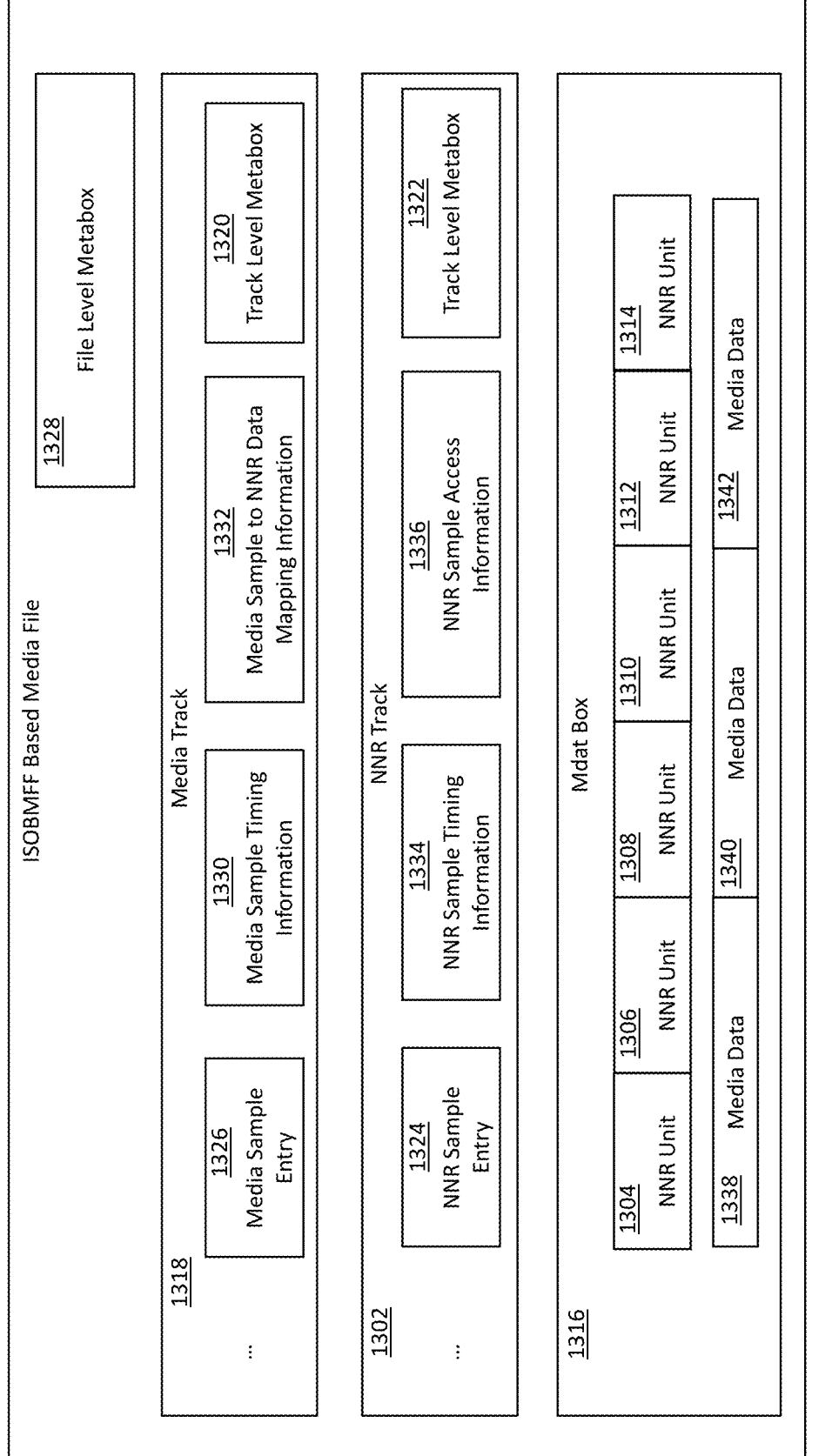
FIG. 13 illustrates a media file for storing and streaming NNR data, in accordance with an embodiment.

FIG. 13 illustrates a media file, for example, an ISOBMFF based media file 1300 for storing and streaming NNR data, in accordance with an embodiment. The ISOBMFF based media file 1300 illustrates how such NNR data could be stored in, for example, an ISOBMFF-like format. An ISOBMFF based media file may be referred to as a media file in some embodiments. Some examples, of ISOBMFF-like format includes, similar object oriented storage formats, such as Matroska (MKV), Apple QuickTime Format (MOV), or AVI format. An NNR track 1302 contains metadata related to NNR units, e.g. NNR units 1304, 1306, 1308, 1310, 1312, and 1314 (e.g. NNR samples) that are stored on a 'mdat' box 1316. There may be one or more of such tracks. For example,
  there may be one or more media tracks, for example, a media track 1318 in the same media file, where such tracks may be linked to NNR track(s).
  NNR tracks and media tracks may be time-aligned
  There may be non-timed NNR items in the media file or track level metabox, for example, a track level metabox 1320 or a track level metabox 1322, which then apply to the file or the tracks that they are in.
  Non-timed NNR items may be linked to one or more NNR samples, for example, an NNR sample entry 1324 or one more media samples, for example, a media sample entry 1326 via SampleToMetadataItemEntry( ) box of ISOBMFF.

ISOBMFF files which contain NNR tracks may be fragmented. In such a case, NNR SampleEntry information may be also present in NNR Sample Group Descriptions.

The following definitions may be introduced so that a neural network representation could be identified in an ISOBMFF-like format. In the following examples, semantic syntax elements and their types are given as examples and may be replaced by other syntax elements and types.

NNR media: Media type which refers to a neural network representation. A new media handler may be defined to represent presence of NNR media in the media file.

NeuralNetworkRepresentation Media Header Box

Box Type: 'nnhd'
Container: MediaInformationBox
Mandatory: Yes
Quantity: Exactly one
NNR tracks shall use a NeuralNetworkRepresentation-MediaHeaderBox in the MediaInformationBox as defined in ISO/IEC 14496-12 [14496-12].

Syntax

```
aligned(8) class NeuralNetworkRepresentationMediaHeaderBox
    extends FullBox('nnhd'', version = 0, 1) {
    // additional boxes and information may be present
}
```

The following sample entry definition may be introduced to describe the samples of NNR tracks:

Neural Network Representation Sample Entry

A generic sample entry type may be defined for describing NeuralNetwork representations in media tracks.

```
aligned(8) class NeuralNetworkRepresentationSampleEntry(codingname)
    extends Sampleentry(codingname) {
    unsigned int(8)[32] compressorname;
    // other boxes from derived specifications
}
```

Samples of NNR tracks may be described by one or more NNR Track Sample Entries, for example, the NNR sample entry 1324 which could be derived from NeuralNetworkRepresentationSampleEntry( )

NNR Track Sample Entry: Sample Entry Type: 'nnrl'
Container: SampleDescriptionBox
Mandatory: A 'nnrl' sample entry is mandatory
Quantity: One or more sample entries may be present
NNR tracks shall use NNRSampleEntry which extends NeuralNetworkRepresentationSampleEntry with a sample entry type of 'nnrl'. An NNR track sample entry shall contain an NNRConfigurationBox which may contain an NNRConfigurationRecord data structure.

NNRConfigurationBox

```
class NNRConfigurationBox extends Box('nnrC') {
    NNRDecoderConfigurationRecord( ) NNRConfig;
}
```

NNRDecoderConfigurationRecord may be defined as follows:

This data structure may contain information for initialization of NNR decoder as well as providing necessary NN model related information. For example, the NN model related information quantization and topology information; and information of initialization of decoder may include NNR parameter sets as defined in the specifications, as well as decoder global parameters for out-of-band value decoder parameter value signalling (e.g. some values needed to initialize CABAC entropy decoder).

```
aligned(8) class NNRDecoderConfigurationRecord {
    unsigned int(4) configurationVersion = 1;
    unsigned int(4) numOfNNRParameterSets;
    unsigned int(4) numOfNNRTopologyUnits;
    unsigned int(4) numOfNNR QuantizationUnits;
    unsigned int(8) numOfNNRUnits;
    for (i=0; i < numOfNNRParameterSets; i++) {
        nnr_unit( ) NNRParameterSet; // nnr_unit( ) of type NNR_MPS or NNR_LPS as defined
    in NNR specification
    }
    for (i=0; i < numOfNNRTopologyUnits; i++) {
        nnr_unit( ) NNRTopologyUnit; // nnr_unit( ) with type NNR_TPL as defined in NNR
    specification
    }
    for (i=0; i < numOfNNRQuantizationUnits; i++) {
        nnr_unit( ) NNRQuantization Unit; // nnr_unit( ) with type NNR_QNT as defined in NNR
    specification
    }
    for (i=0; i < numOfNNRUnits; i++) {
        nnr_unit( ) NNRUnit; // nnr_unit( ) of any type which describes the NNR representation.
    (optionally present)
    }
    // additional fields
}
```

The contents of this sample entry may also be present in the NNR Sample Groups Descriptions. NNR Sample Group Descriptions may be present in a fragmented ISOBMFF file which carries NNR data.

For NNR_AGG units, NNR_LPS units may also be stored in respective sample entries or SampleGroupDescriptionEntries.

When numOfNNRTopologyUnits is 0, it may indicate that NNR Topology information may be present in the track level or file level metabox, for example, a file level metabox 1328 as non-timed NNR Items which contain topology information.

When numOfNNRQuantizationUnits is 0, it may indicate that NNR Quantization information may be present in the track level or the file level metabox as non-timed NNR Items which contain quantization information.

In another embodiment, track level data reference (in 'dref') could be utilized to point to an external file which contains the Topology information. In such a case, NNR-configurationRecord may contain a flag indicating the presence of such a reference to topology data.

NNR Track Sample Definition

An NNR track sample, an NNR sample access information 1336, is comprised of one or more NNR units, e.g. one or more of NNR units 1304, 1306, 1308, 1310, 1312, 1314. They may be linked to NNR unit parameter sets via.
Sample Entries
Sample Groups
non-timed NNR items in meta boxes at file or track level (may also utilize SampleToMetadataItemEntry( )
An NNR track sample may be:
Independently decodable (a sync. sample)
Dependent on previous samples for decoding
An NNR track sample, for example, a media sample to an NNR data mapping information 1332 may be utilized by other media tracks for decoding the media samples of the other tracks. Such a relationship may be done by using a track referencing mechanism ('tref'). A track reference of type ('nnrt') may be defined to link an NNR track to its related media track(s). The relationship could be initiated from the media track towards the NNR track or vice-versa.

In another embodiment, there could be NAL units which are NNR compressed and defined in an audio/video codec context. Such NAL units may be aggregated in NNR tracks as samples of NNR track and then linked to the media tracs that they apply. Time alignment of such media tracks may be done via the sample composition timing mechanisms.

In another embodiment, if topology or quantization information is also changing in time, (e.g. incrementally building an NN or providing weight and architecture updates):
Initial topology may be signalled in the initial NNR Track Sample Entry
A topology update may be signalled as a new NNR Track Sample Entry or as a new Sample Group Description.
Alternatively, an NNR track may contain the topology information and then liked to the other NNR track.
Topology could be created incrementally, e.g. the NNR track samples with topology data may override existing topology, update it or amended to it.

The ISOBMFF based media file 1300 is also shown to include a media sample timing information 1330, an NNR sample timing information 1334, a media data 1338, a media data 1340, a media data 1342. The media sample timing information 1330, and the NNR sample timing information 1334 are ISOBMFF media sample timing mechanism that utilize 'stts', 'ctts' and 'cslg' boxes and other boxes which modify the sample playback and timeline. The media data 1338, the media data 1340, the media data 1342 are media track's samples which are logically same or substantially same and contain, for e.g., audio/video media data. However, some of those media data may require NNR data for decoding.

FIG. 14 is an example apparatus 1400, which may be implemented in hardware, configured to implement mechanisms to link the HLS to an MPEG media storage and carriage format (e.g. ISOBMFF based media file) for a compressed representation of neural networks, based on the examples described herein. The apparatus 1400 comprises a at least one processor 1402, at least one non-transitory memory 1404 including computer program code 1405, wherein the at least one memory 1404 and the computer program code 1405 are configured to, with the at least one processor 1402, cause the apparatus 1400 to implement mechanisms to link the HLS to an MPEG media storage and carriage format 1406 based on the examples described herein. The apparatus 1400 optionally includes a display 1408 that may be used to display content during rendering. The apparatus 1400 optionally includes one or more network (NW) interfaces (I/F(s)) 1410. The NW I/F(s) 1410 may be wired and/or wireless and communicate over the Internet/other network(s) via any communication technique. The NW I/F(s) 1410 may comprise one or more transmitters and one or more receivers.

Figure 15:
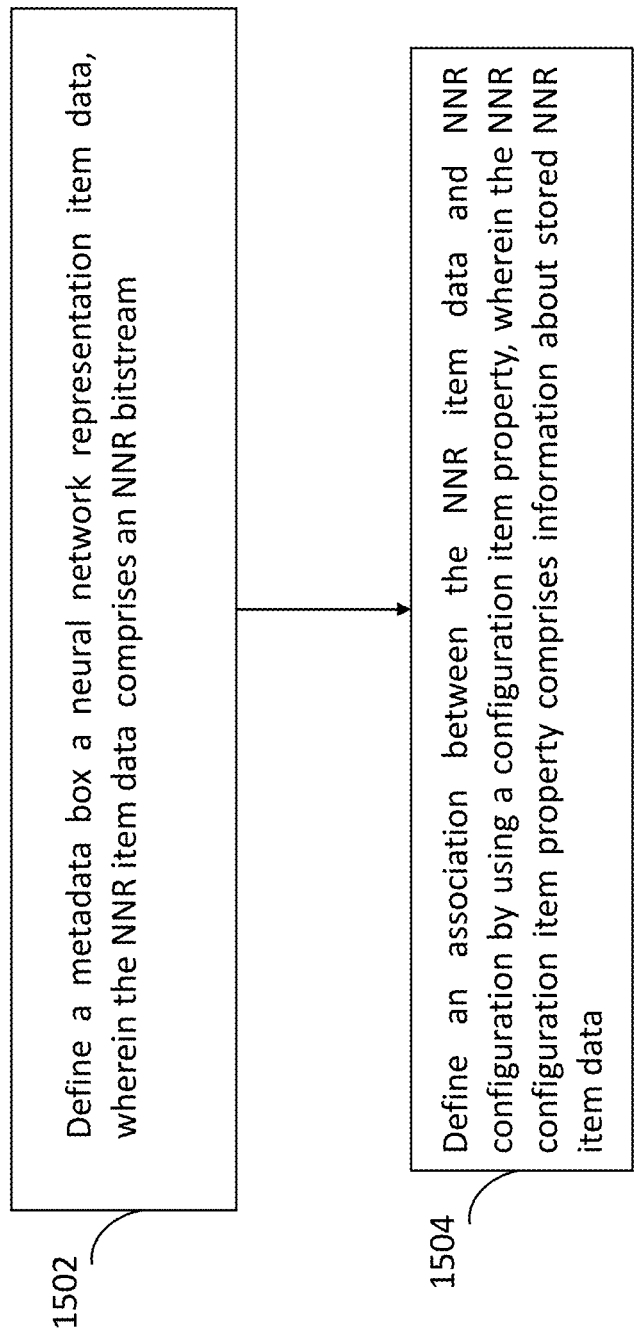
FIG. 15 is a flowchart illustrating the operations performed to implement mechanisms to link a high level syntax to an MPEG media storage and carriage format for a compressed representation of neural networks, in accordance with an embodiment.

FIG. 15 is an example method 1500 to implement mechanisms to link the HLS to an MPEG media storage and carriage format (e.g. ISOBMFF based media file) for a compressed representation of neural networks. As shown in block 1502 of FIG. 15, the apparatus 1400 includes means, such as the processing circuitry or processor 1402 or the like, for defining a metadata box a neural network representation item data. The NNR item data includes an NNR bitstream. As shown in block 1504 of FIG. 15, the apparatus 1400 includes means, such as the processing circuitry or processor 1402 or the like, for defining an association between the NNR item data and NNR configuration by using a configuration item property. The wherein the NNR configuration item property includes information about stored NNR item data.

In an embodiment, the NRR configuration item property further includes at least of an NNR model parameter set data unit or NNR layer parameter set data unit. In another embodiment, the NNR configuration property also includes an NNR decoder configuration record, which includes an NNR decoder configuration.

In an embodiment, the method 1500 further includes storing NNR item data, topology of NNR item data, and quantization information of NNR item data; and associating the NNR item data, the topology of NNR item data, and the quantization information of NNR item data with each other by item referencing. In another embodiment, the method 1500 further includes configuring NNR item data into one or more NNR unit items, where each NNR unit item includes one or more NNR units. In another embodiment, the method 1500 further includes configuring NNR unit header information into a separate item property and associating an item property with the one or more NNR unit items.

FIG. 16 is an example method 1600 to define a media file for storage and carriage for a compressed representation of neural networks. As shown in block 1602 of FIG. 16, the apparatus 1400 includes means, such as the processing circuitry or processor 1402 or the like, for defining a media file including:

one or more neural network representation (NNR) tracks, and the one or more NNR tracks includes one or more NNR units and metadata associated with the one or more NNR units;

one or more media tracks, which are linked to the one or more NNR tracks;

an NNR media, which is a media type referring to an NNR; and a media handler, which represents presence of NNR media in the media file.

As shown in block 1604 of FIG. 16, the apparatus 1400 includes means, such as the processing circuitry or processor 1402 or the like, for using the media file for at least one of storing or streaming NNR.

In an embodiment, the media file further includes NNR sample entry for describing one or more NNRs in the one or more media tracks. In another embodiment, the media file further includes an NNR decoder configuration record, which includes information for initializing an NNR decoder information corresponding to neural network model.

In an embodiment, the method 1600 further includes defining an NNR track sample including one or more NNR units. The NNR track sample is linked to an NNR unit parameter via one or more of a sample entry, a sample group, or a non-timed NNR item data. In another embodiment, the method 1600 further includes defining a network abstraction layer (NAL) unit, which is aggregated in NNR tracks as a sample of NNR track and linked to the associated media track. In an embodiment, the NNR track sample may be independently decodable or dependent of previous sample for decoding. The NNR track sample may be used by other media tracks for decoding media samples of the other media tracks. A track referencing mechanism may be used to associate the NNR track with the other media tracks for decoding the media samples of the other media tracks.

Figure 17:
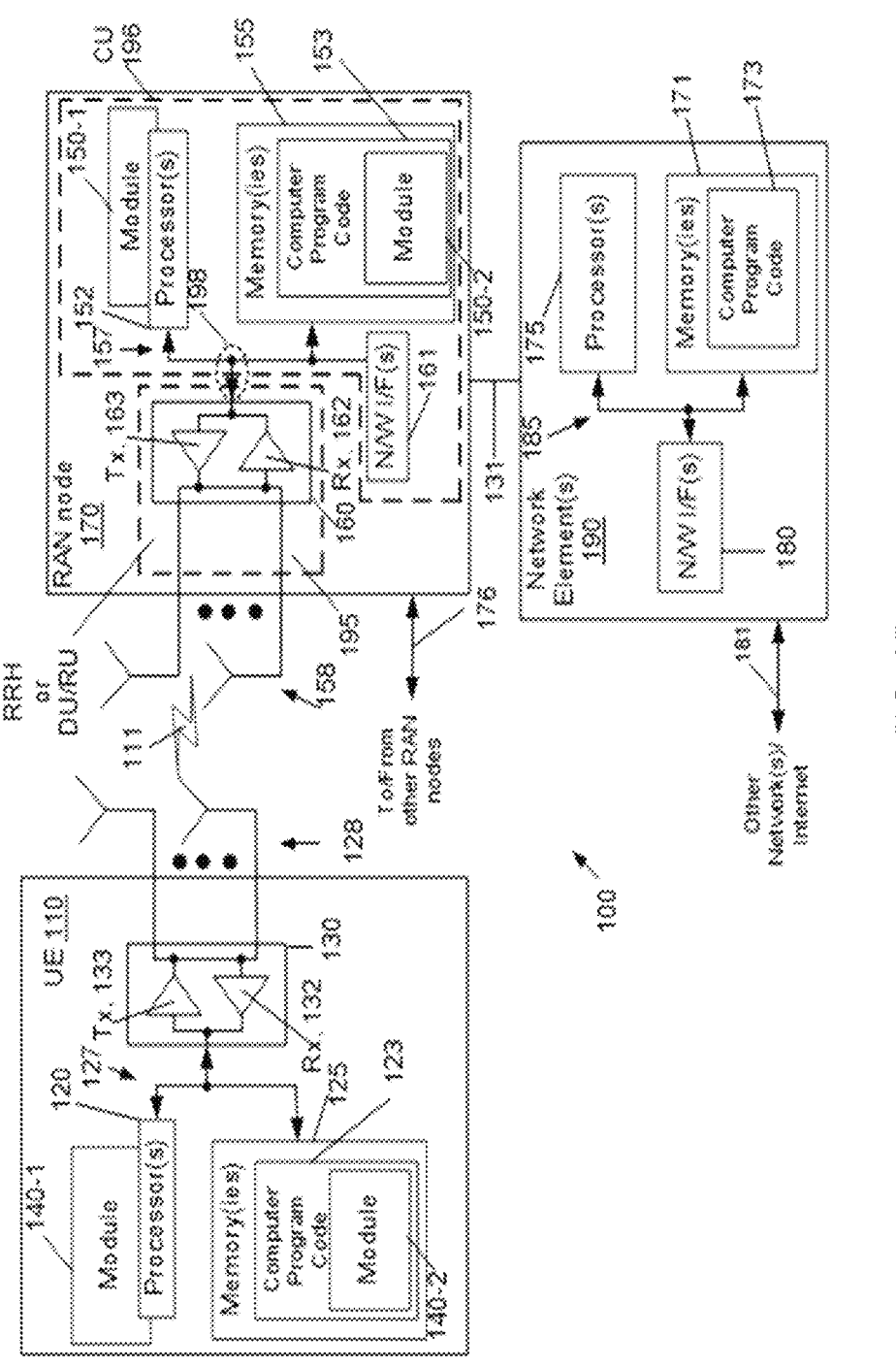
FIG. 17 is a block diagram of one possible and non-limiting system in which the example embodiments may be practiced.

Turning to FIG. 17, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module

150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, for example, link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (for example, a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (for example, the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualiza-tion, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as pro-cessors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, opti-cal memory devices and systems, fixed memory and remov-able memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equip-ment 110 can include, but are not limited to, cellular telephones such as smart phones, tablets, personal digital assistants (PDAs) having wireless communication capabili-ties, portable computers having wireless communication capabilities, image capture devices such as digital cameras having wireless communication capabilities, gaming devices having wireless communication capabilities, music storage and playback appliances having wireless communi-cation capabilities, Internet appliances permitting wireless Internet access and browsing, tablets with wireless commu-nication capabilities, as well as portable units or terminals that incorporate combinations of such functions.

One or more of modules 140-1, 140-2, 150-1, and 150-2 may be configured to implement mmechanisms to link the HLS to an MPEG media storage and carriage format of neural networks based on the examples described herein. Computer program code 173 may also be configured to implement mechanisms to link the HLS to an MPEG media storage and carriage format for a compressed representation of neural networks based on the examples described herein.

An example method includes defining a metadata box for a neural network representation (NNR) item data, wherein the NNR item data comprises an NNR bitstream; and defining an association between the NNR item data and an NNR configuration by using a configuration item property, wherein the NNR configuration item property comprises information about stored NNR item data.

The method may further include, wherein the NRR con-figuration item property further comprises at least of an NNR model parameter set data unit or NNR layer parameter set data unit.

The method may further include, wherein the NNR con-figuration item property further comprises an NNR decoder configuration record, wherein the NNR decoder configura-tion record comprises an NNR decoder configuration.

The method may further include, wherein the NNR decoder configuration record further comprises at least one of information for initialization of NNR decoder or infor-mation of a neural network (NN) model.

The method may further include storing the NNR item data, a topology information of the NNR item data, and a quantization information of the NNR item data; and associating the NNR item data, the topology of the NNR item data, and the quantization information of the NNR item data with each other by item referencing.

The method may further include, wherein the NNR item data further comprises one or more NNR unit items.

The method may further include, wherein an NNR unit item of the one or more NNR unit items comprises one or more NNR units.

The method may further include, wherein an NNR unit item of the one or more NNR unit items comprises at least one of an NNR start unit, an NNR topology data unit, or an NNR quantization data unit.

The method may further include defining a topology unit item, wherein the topology unit item comprises a topology information of the NNR unit item.

The method may further include defining a quantization unit item, wherein the quantization unit item comprises a quantization information of the NNR unit item.

The method may further include using an item reference mechanism to establish an association between the NNR unit item and the NNR item data.

The method may further include using an entity grouping mechanism to establish an association between the NNR unit item and the NNR item data.

The method may further include, wherein the topology unit item is stored as an item of type uniform resource identifier (uri), when the topology unit item is stored in an external file location, and wherein the topology unit item comprises uri pointing to a network accessible information resource.

The method may further include, wherein the quantization unit item is stored as an item of type uniform resource identifier (uri), when the quantization unit item is stored in an external file location, and wherein the quantization unit item comprises uri pointing to a network accessible information resource.

The method may further include, wherein the topology or quantization information changes over time.

The method may further include, wherein the topology information is signaled in an initial track sample entry, and wherein an updated topology information is signaled as a separate sample entry or as a new sample group description.

The method may further include, wherein the topology information is created incrementally.

The method may further include configuring the NNR item data into one or more NNR unit items, wherein each NNR unit item comprises one or more NNR units.

The method may further include comprising storing additional unit item in other NNR unit item comprising an item reference of type 'nnru'.

The method may further include configuring an NNR unit header information into an item property; and associating an item property with the one or more NNR unit items.

The method may further include defining an NNR unit header for each of the one or more NNR units, wherein the NNR unit header for the each of the one or more NNR units is stored in data of the associated NNR unit item.

The method may further include, wherein the one or more NNR unit items are arranged in a pre-defined order.

The method may further include, wherein in the one or more NNR unit items are fragmented into one or more extents for enabling interleaving, wherein an extent is contiguous subset of bytes of a resource.

The method may further include forming the resource by concatenating the one or more extents in an order specified in an item location box.

The method may further include, wherein one or more item references and the one or more extents are used to represent the NNR bitstream.

An another example method includes defining a media file comprising one or more neural network representation (NNR) tracks, wherein the one or more NNR tracks comprises one or more NNR units and metadata associated with the one or more NNR units; one or more media tracks, wherein the one or more media tracks are linked to the one or more NNR tracks; an NNR media, wherein NNR is a media type referring to an NNR; and a media handler, wherein the media handler represents presence of the NNR media in the media file; and using the media file for at least one of storing or streaming NNR.

The method may further include, wherein the media file further comprises an NNR sample entry for describing one or more NNRs in the one or more media tracks.

The method may further include, wherein the media file further comprises an NNR decoder configuration record, wherein the NNR decoder configuration record comprises information for initializing an NNR decoder information corresponding to a neural network model.

The method may further include defining an NNR track sample comprising the one or more NNR units.

The method may further include, wherein the NNR track sample is linked to an NNR unit parameter via one or more of a sample entry, a sample group, or a non-timed NNR item data.

The method may further include comprising defining a network abstraction layer (NAL) unit, wherein the NAL unit is aggregated in the one or more NNR tracks as a sample of a NNR track and linked to an associated media track.

The method may further include, wherein the NNR track sample is one of independently decodable or dependent of previous sample for decoding.

The method may further include, wherein the NNR track sample is used by other media tracks for decoding media samples of the other media tracks, wherein a track referencing mechanism is used to associate the NNR track with the other media tracks for decoding the media samples of the other media tracks.

An example apparatus comprises at least one processor; and at least one memory including computer program code; the at least one memory and the computer program code configured to, with the at least one processor, cause the apparatus at least to perform: define a metadata box for a neural network representation (NNR) item data, wherein the NNR item data comprises an NNR bitstream; and define an association between the NNR item data and an NNR configuration by using a configuration item property, wherein the NNR configuration item property comprises information about stored NNR item data.

The apparatus may further include, wherein the NRR configuration item property further comprises at least of an NNR model parameter set data unit or NNR layer parameter set data unit.

The apparatus may further include, wherein the NNR configuration item property further comprises an NNR decoder configuration record, wherein the NNR decoder configuration record comprises an NNR decoder configuration.

The apparatus may further include, wherein the NNR decoder configuration record further comprises at least one of information for initialization of NNR decoder or information of a neural network (NN) model.

The apparatus may be further caused to store the NNR item data, a topology information of the NNR item data, and a quantization information of the NNR item data; and associate the NNR item data, the topology of the NNR item data, and the quantization information of the NNR item data with each other by item referencing.

The apparatus may further include, wherein the NNR item data further comprises one or more NNR unit items.

The apparatus may further include, wherein an NNR unit item of the one or more NNR unit items comprises one or more NNR units.

The apparatus may further include, wherein an NNR unit item of the one or more NNR unit items comprises at least one of an NNR start unit, an NNR topology data unit, or an NNR quantization data unit.

The apparatus may be further caused to define topology unit item, wherein the topology unit item comprises a topology information of the NNR unit item.

The apparatus may be further caused to define quantization unit item, wherein the quantization unit item comprises a quantization information of the NNR unit item.

The apparatus may be further caused to use an item reference mechanism to establish an association between the NNR unit item and the NNR item data.

The apparatus may be further caused to use an entity grouping mechanism to establish an association between the NNR unit item and the NNR item data.

The apparatus may further include, wherein the topology unit item is stored as an item of type uniform resource identifier (uri), when the topology unit item is stored in an external file location, and wherein the topology unit item comprises uri pointing to a network accessible information resource.

The apparatus may further include, wherein the quantization unit item is stored as an item of type uniform resource identifier (uri), when the quantization unit item is stored in an external file location, and wherein the quantization unit item comprises uri pointing to a network accessible information resource.

The apparatus may further include, wherein the topology or quantization information changes over time.

The apparatus may further include, wherein the topology information is signaled in an initial track sample entry, and wherein an updated topology information is signaled as a separate sample entry or as a new sample group description.

The apparatus may further include, wherein the topology information is created incrementally.

The apparatus may be further caused to is further caused to configure the NNR item data into one or more NNR unit items, wherein each NNR unit item comprises one or more NNR units.

The apparatus may be further caused to store additional unit item in other NNR unit item comprising an item reference of type 'nnru'.

The apparatus may be further caused to configure an NNR unit header information into an item property; and associate an item property with the one or more NNR unit items.

The apparatus may be further caused to define an NNR unit header for each of the one or more NNR units, wherein the NNR unit header for the each of the one or more NNR units is stored in data of the associated NNR unit item.

The apparatus may further include, wherein the one or more NNR unit items are arranged in a pre-defined order.

The apparatus may further include, wherein in the one or more NNR unit items are fragmented into one or more extents for enabling interleaving, wherein an extent is contiguous subset of bytes of a resource.

The apparatus may be further caused to form the resource by concatenating the one or more extents in an order specified in an item location box.

The apparatus may further include, wherein one or more item references and the one or more extents are used to represent the NNR bitstream.

An another example apparatus includes at least one processor; and at least one memory including computer program code; the at least one memory and the computer program code configured to, with the at least one processor, cause the apparatus at least to perform define a media file comprising one or more neural network representation (NNR) tracks, wherein the one or more NNR tracks comprises one or more NNR units and metadata associated with the one or more NNR units; one or more media tracks, wherein the one or more media tracks are linked to the one or more NNR tracks; an NNR media, wherein NNR is a media type referring to an NNR; and a media handler, wherein the media handler represents presence of the NNR media in the media file; and use the media file for at least one of storing or streaming NNR.

The apparatus may further include, wherein the media file further comprises an NNR sample entry for describing one or more NNRs in the one or more media tracks.

The apparatus may further include, wherein the media file further comprises an NNR decoder configuration record, wherein the NNR decoder configuration record comprises information for initializing an NNR decoder information corresponding to a neural network model.

The apparatus may be further caused to define an NNR track sample comprising the one or more NNR units.

The apparatus may further include, wherein the NNR track sample is linked to an NNR unit parameter via one or more of a sample entry, a sample group, or a non-timed NNR item data.

The apparatus may be further caused to define a network abstraction layer (NAL) unit, wherein the NAL unit is aggregated in the one or more NNR tracks as a sample of NNR track and linked to an associated media track.

The apparatus may further include, wherein the NNR track sample is one of independently decodable or dependent of previous sample for decoding.

The apparatus may further include, wherein the NNR track sample is used by other media tracks for decoding media samples of the other media tracks, wherein a track referencing mechanism is used to associate the NNR track with the other media tracks for decoding the media samples of the other media tracks.

An example computer readable medium includes program instructions for causing an apparatus to perform the methods in various embodiments.

The computer readable medium may further include, wherein the computer readable medium comprises a non-transitory computer readable medium.

As described above, FIGS. 15 and 16 include a flowchart of an apparatus (e.g. 50, 100, 700, or 1400), method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory (e.g. 58, 125, 704, and 1404) of an apparatus employing an embodiment of the present invention and executed by processing circuitry (e.g. 56, 120, 702, and 1402) of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 15 and 16. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Accordingly, the description is intended to embrace all such alternatives, modifications and variances which fall within the scope of the appended claims. Although specific terms are employed herein, they are used in a generic and descriptive sense only and not for purposes of limitation.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
defining a media file comprising one or more neural network representation (NNR) tracks, wherein the one or more NNR tracks comprises one or more NNR units and metadata associated with the one or more NNR units and a media handler, wherein the media handler represents presence of NNR media in the media file, and wherein the NNR media is a media type referring to NNR; and
using the media file for at least one of storing or streaming NNR.

2. The method of claim 1, wherein the media file further comprises:
an NNR sample entry for describing one or more NNRs in the one or more NNR tracks; and
an NNR decoder configuration record, wherein the NNR decoder configuration record comprises information for initializing an NNR decoder information corresponding to a neural network model.

3. The method of claim 1 further comprising defining an NNR track sample comprising the one or more NNR units, wherein the NNR track sample is one of independently decodable or dependent of previous sample for decoding.

4. The method of claim 3, wherein the NNR track sample is linked to an NNR parameter set via one or more of a sample entry, a sample group, or a non-timed NNR item data.

5. The method of claim 3, wherein the media file further comprises one or more media tracks, wherein the one or more media tracks are linked to the one or more NNR tracks, and wherein the NNR track sample is used by the one or more media tracks for decoding media samples of the one or more media tracks, and wherein a track referencing mechanism is used to associate the one or more NNR tracks with the one or more media tracks for decoding the media samples of the one or more media tracks.

6. An apparatus comprising at least one processor; and at least one memory storing instructions that, when executed by the at least one processor, cause the apparatus at least to:
defining a media file comprising one or more neural network representation (NNR) tracks, wherein the one or more NNR tracks comprises one or more NNR units and metadata associated with the one or more NNR units and a media handler, wherein the media handler represents presence of NNR media in the media file, and wherein the NNR media is a media type referring to NNR; and using the media file for at least one of storing or streaming NNR.

7. The apparatus of claim 6, wherein the media file further comprises:

an NNR sample entry for describing one or more NNRs in the one or more NNR tracks; and an NNR decoder configuration record, wherein the NNR decoder configuration record comprises information for initializing an NNR decoder information corresponding to a neural network model.

8. The apparatus of claim 6, wherein the apparatus is further caused to perform: defining an NNR track sample comprising the one or more NNR units, and wherein the NNR track sample is one of independently decodable or dependent of previous sample for decoding.

9. The apparatus of claim 8, wherein the NNR track sample is linked to an NNR parameter set via one or more of a sample entry, a sample group, or a non-timed NNR item data.

10. The apparatus of claim 8, wherein the media file further comprises one or more media tracks, wherein the one or more media tracks are linked to the one or more NNR tracks, and wherein the NNR track sample is used by the one or more media tracks for decoding media samples of the one or more media tracks, and wherein a track referencing mechanism is used to associate the one or more NNR tracks with the one or more media tracks for decoding the media samples of the one or more media tracks.

11. A method comprising:

receiving, one or more tracks and a media handler of the one or more tracks, within a media file;

decoding the media handler of the one or more tracks to obtain a decoded media handler;

when the decoded media handler indicates presence of a neural network representation (NNR) media in the media file, wherein the NNR media is a media type referring to NNR, treating the one or more tracks as one or more NNR tracks comprising one or more NNR units and metadata associated with the one or more NNR units; and decoding the one or more tracks to obtain an uncompressed neural network.

12. The method of claim 11, wherein the media file further comprises:

an NNR sample entry for describing one or more NNRs in the one or more NNR tracks; and an NNR decoder configuration record, wherein the NNR decoder configuration record comprises information for initializing an NNR decoder information corresponding to a neural network model.

13. The method of claim 11, wherein the one or more NNR units are comprised in an NNR track sample and wherein the NNR track sample is one of independently decodable or dependent of previous sample for decoding.

14. The method of claim 13, wherein the NNR track sample is linked to an NNR parameter set via one or more of a sample entry, a sample group, or a non-timed NNR item data.

15. The method of claim 13, wherein the media file further comprises one or more media tracks, wherein the one or more media tracks are linked to the one or more NNR tracks, and wherein the NNR track sample is used by the one or more media tracks for decoding media samples of the one or more media tracks, and wherein a track referencing mechanism is used to associate the one or more NNR tracks with the one or more media tracks for decoding the media samples of the one or more media tracks.

16. An apparatus comprising at least one processor; and at least one memory storing instructions that, when executed by the at least one processor, cause the apparatus at least to perform:

receiving, one or more tracks and a media handler of the one or more tracks, within a media file;

decoding the media handler of the one or more tracks to obtain a decoded media handler;

when the decoded media handler indicates presence of a neural network representation (NNR) media in the media file, wherein the NNR media is a media type referring to NNR, treating the one or more tracks as one or more NNR tracks comprising one or more NNR units and metadata associated with the one or more NNR units; and decoding the one or more tracks to obtain an uncompressed neural network.

17. The apparatus of claim 16, wherein the media file further comprises:

an NNR sample entry for describing one or more NNRs in the one or more NNR tracks; and an NNR decoder configuration record, wherein the NNR decoder configuration record comprises information for initializing an NNR decoder information corresponding to a neural network model.

18. The apparatus of claim 16, wherein the one or more NNR units are comprised in an NNR track sample and wherein the NNR track sample is one of independently decodable or dependent of previous sample for decoding.

19. The apparatus of claim 18, wherein the NNR track sample is linked to an NNR parameter set via one or more of a sample entry, a sample group, or a non-timed NNR item data.

20. The apparatus of claim 18, wherein the media file further comprises one or more media tracks, wherein the one or more media tracks are linked to the one or more NNR tracks, and wherein the NNR track sample is used by the one or more media tracks for decoding media samples of the one or more media tracks, and wherein a track referencing mechanism is used to associate the one or more NNR tracks with the one or more media tracks for decoding the media samples of the one or more media tracks.

* * * * *